United States Patent
Kawasaki

(10) Patent No.: US 9,888,456 B2
(45) Date of Patent: Feb. 6, 2018

(54) MULTICAST TRANSMISSION TERMINAL, MULTICAST RECEPTION TERMINAL, MULTICAST SYSTEM, COMPUTER READABLE STORAGE DEVICE, MULTICAST TRANSMISSION METHOD, AND MULTICAST RECEPTION METHOD

(71) Applicant: OLYMPUS CORPORATION, Tokyo (JP)

(72) Inventor: Shinya Kawasaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 282 days.

(21) Appl. No.: 14/699,721

(22) Filed: Apr. 29, 2015

(65) Prior Publication Data

US 2015/0245315 A1    Aug. 27, 2015

Related U.S. Application Data

(63) Continuation of application No. PCT/JP2013/077065, filed on Oct. 4, 2013.

(30) Foreign Application Priority Data

Nov. 21, 2012  (JP) .................................. 2012-255208

(51) Int. Cl.
*H04L 12/28*    (2006.01)
*H04W 72/00*    (2009.01)
(Continued)

(52) U.S. Cl.
CPC ......... *H04W 72/005* (2013.01); *H04L 1/1607* (2013.01); *H04L 1/1883* (2013.01);
(Continued)

(58) Field of Classification Search
CPC . H04W 72/005; H04W 72/0453; H04W 4/06; H04L 5/0037; H04L 5/0055; H04L 2001/0093; H04L 1/1607; H04L 1/1883
See application file for complete search history.

(56) References Cited

U.S. PATENT DOCUMENTS

| 4,839,582 A * | 6/1989 | Fukaya ................ G01R 23/173 324/76.19 |
| 6,223,286 B1 * | 4/2001 | Hashimoto ......... H04L 12/1868 380/280 |

(Continued)

FOREIGN PATENT DOCUMENTS

| JP | 2004-48250 A | 2/2004 |
| JP | 2005-354181 A | 12/2005 |

(Continued)

OTHER PUBLICATIONS

International Search Report dated Nov. 12, 2013, issued in corresponding application No. PCT/JP2013/077065.

(Continued)

*Primary Examiner* — Ricky Ngo
*Assistant Examiner* — Lan Huong Truong
(74) *Attorney, Agent, or Firm* — Westerman, Hattori, Daniels & Adrian,

(57) ABSTRACT

Provided is a multicast transmission terminal including: a transmission/reception unit that performs multicast transmission using a predetermined center frequency and a bandwidth, and receives acknowledgement transmitted using a center frequency different from the center frequency of the multicast transmission and a bandwidth narrower than the bandwidth of the multicast transmission; a discovery unit that transmits an inquiry packet in a broadcast manner and discovers reception terminals (destinations of the multicast transmission); an allocation unit that allocates a center frequency used when the reception terminal transmits the (Continued)

acknowledgement in response to the number of reception terminals discovered by the discovery unit, allocates the center frequency different from the center frequency of the multicast transmission to the reception terminal, and generates an allocation list indicating the allocation; and a notification control unit that allows the unit to transmit the allocation list in multicast manner.

14 Claims, 14 Drawing Sheets

(51) Int. Cl.
      *H04W 4/06*       (2009.01)
      *H04L 1/18*       (2006.01)
      *H04L 1/16*       (2006.01)
      *H04W 72/04*       (2009.01)
      *H04L 1/00*       (2006.01)
      *H04L 5/00*       (2006.01)

(52) U.S. Cl.
    CPC ............. *H04W 4/06* (2013.01); *H04L 5/0037* (2013.01); *H04L 5/0055* (2013.01); *H04L 2001/0093* (2013.01); *H04W 72/0453* (2013.01)

(56) References Cited

U.S. PATENT DOCUMENTS

| | | | |
|---|---|---|---|
| 7,127,655 B2* | 10/2006 | Chandhok | ........... H04L 12/1868 714/748 |
| 2003/0048784 A1* | 3/2003 | Murai | ................. H04L 12/18 370/390 |
| 2004/0053622 A1 | 3/2004 | Nakakita et al. | |
| 2007/0189207 A1 | 8/2007 | Sammour et al. | |
| 2007/0223611 A1* | 9/2007 | Ode | ........................ H04L 5/0007 375/260 |
| 2008/0165717 A1 | 7/2008 | Chen et al. | |
| 2010/0014520 A1* | 1/2010 | Matsumoto | ......... H04L 12/1868 370/390 |
| 2010/0061285 A1* | 3/2010 | Maeda | ..................... H04W 4/06 370/312 |
| 2012/0106427 A1* | 5/2012 | Nakae | ................. H04L 12/1868 370/312 |
| 2012/0314824 A1* | 12/2012 | Fujimura | ........... H04B 7/15542 375/350 |

FOREIGN PATENT DOCUMENTS

| | | |
|---|---|---|
| JP | 3822466 B2 | 9/2006 |
| JP | 2007-214920 A | 8/2007 |
| JP | 2011-223171 A | 11/2011 |
| WO | 2005/104434 A1 | 11/2005 |

OTHER PUBLICATIONS

Santos et al, "A Novel QoE-Aware Multicast Mechanism for Video Communications over IEEE 802.11 WLANs", IEEE Journal On Selected Areas In Communications, vol. 30, No. 7, 2012, pp. 1205-1214.

European (supplementary) Search Report dated May 31, 2016, issued in counterpart European Patent Application No. 13856287.1. (10 pages).

* cited by examiner

| Rx No | Addr | ACK freq | |
|---|---|---|---|
| 1 | Addr_1 | f_1 | ROW 801 |
| 2 | Addr_2 | f_2 | ROW 802 |
| 3 | Addr_3 | f_3 | ROW 803 |
| n | Addr_n | f_n | ROW 804 |

FIG. 9
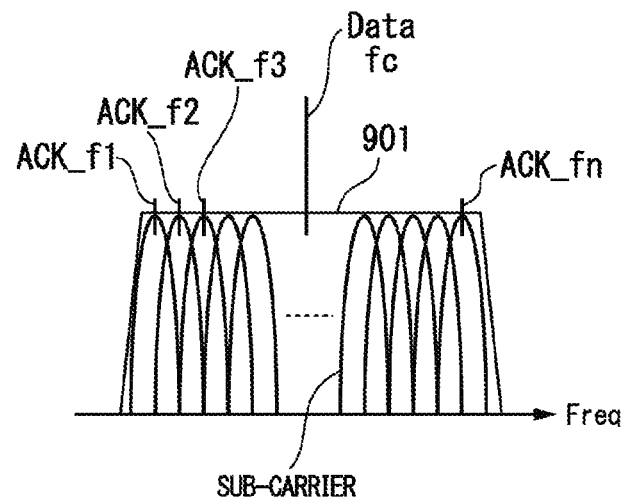
FIG. 10
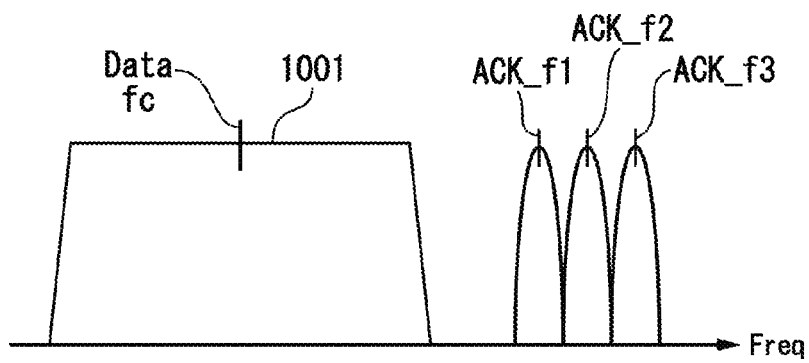
FIG. 11
| Rx No | Addr   | ACK freq | ACK Timing |           |
|-------|--------|----------|------------|-----------|
| 1     | Addr_1 | f_1      | t1         | ROW 1101  |
| 2     | Addr_2 | f_2      | t1         | ROW 1102  |
| 3     | Addr_3 | f_3      | t1         | ROW 1103  |
| n     | Addr_n | f_n      | t2         | ROW 1104  |

| Rx No | Addr   | ACK freq | ACK Timing |          |
|-------|--------|----------|------------|----------|
| 1     | Addr_1 | f_2      | t1         | ROW 1701 |
| 2     | Addr_2 | f_2      | t2         | ROW 1702 |
| 3     | Addr_3 | f_2      | t3         | ROW 1703 |
| n     | Addr_n | f_2      | tn         | ROW 1704 |

MULTICAST TRANSMISSION TERMINAL, MULTICAST RECEPTION TERMINAL, MULTICAST SYSTEM, COMPUTER READABLE STORAGE DEVICE, MULTICAST TRANSMISSION METHOD, AND MULTICAST RECEPTION METHOD

CROSS REFERENCE TO RELATED APPLICATIONS

This application is a continuation application based on a PCT Patent Application No. PCT/JP2013/077065, filed Oct. 4, 2013, whose priority is claimed on Japanese Patent Application No. 2012-255208, filed Nov. 21, 2012, the entire content of which are hereby incorporated by reference.

BACKGROUND OF THE INVENTION

Field of the Invention

The present invention relates to a multicast transmission terminal, a multicast reception terminal, a multicast system, a program, a multicast transmission method, and a multicast reception method.

Description of the Related Art

A case of performing video streaming from one transmitter to a plurality of receivers in realtime is assumed. With this assumption, in the case of operating a device while confirming a video or in the case of issuing an accurate instruction to an operator during the operation, it is necessary to ensure a realtime property in the video streaming. Furthermore, it is also important to ensure communication quality such that video interruption does not frequently occur.

As described above, as in the case of performing video streaming from one transmitter to a plurality of receivers in realtime, multicast communication is known as a method for performing one-to-many communication. Typically, in the multicast communication, there is no delivery confirmation based on ACK (ACKnowledgement) or NACK (Negative ACKnowledgement). Accordingly, the transmitter is not able to determine whether a transmitted multicast packet has been received normally on the receiver side. For example, when the receiver is not able to receive the multicast packet normally, since there is no retransmission process from the transmitter, a video may be interrupted.

As a method for solving the aforementioned problems, a method in which a transmitter transmits the same multicast packet a plurality of times is considered. FIG. 20 is a timing chart illustrating a timing at which a transmitter transmits the same multicast packet and a timing at which a receiver receives the multicast packet when the transmitter transmits the same multicast packet a plurality of times.

In the illustrated example, timings at which a transmitter TX transmits a multicast packet and timings at which each of receivers RX1 and RX2 receives the multicast packet are illustrated. The transmitter TX transmits the same multicast packet three times. In detail, the transmitter TX transmits a multicast packet P1 three times, transmits a multicast packet P2 three times, and then transmits a multicast packet P3 three times.

The receivers RX1 and RX2 perform a reception process of the multicast packets transmitted from the transmitter TX. However, when a multicast packet that is the same as a multicast packet received once is further received, the receivers RX1 and RX2 discard multicast packets received later.

In detail, since the receiver RX1 is able to receive the first transmitted multicast packet P1 among the multicast packets P1 transmitted three times, the receiver RX1 receives and discards the second and third transmitted multicast packets P1. Furthermore, since the receiver RX1 is able to receive the first transmitted multicast packet P2 among the multicast packets P2 transmitted three times, the receiver RX1 receives and discards the second and third transmitted multicast packets P2. Furthermore, since the receiver RX1 is able to receive the first transmitted multicast packet P3 among the multicast packets P3 transmitted three times, the receiver RX1 receives and discards the second and third transmitted multicast packets P3.

Furthermore, since the receiver RX2 is not able to receive the first transmitted multicast packet P1 among the multicast packets P1 transmitted three times, but is able to receive the second transmitted multicast packet P1, the receiver RX2 receives and discards the third transmitted multicast packet P1. Furthermore, since the receiver RX2 is able to receive the first transmitted multicast packet P2 among the multicast packets P2 transmitted three times, the receiver RX2 receives and discards the second and third transmitted multicast packets P2. Furthermore, since the receiver RX2 is able to receive the first transmitted multicast packet P3 among the multicast packets P3 transmitted three times, the receiver RX2 receives and discards the second and third transmitted multicast packets P3.

As described above, when the transmitter transmits the same multicast packet a plurality of times, even if the receiver is not able to receive some of the multicast packets, it is highly probable that it will be possible to receive all types of multicast packets. However, since the same multicast packet is always transmitted a plurality of times, it is always necessary to ensure a band on a time axis and it is not preferable in terms of efficiency.

Furthermore, as a method for solving the aforementioned problems, a method in which each reception side returns an ACK signal with respect to a multicast packet transmitted from a transmitter is considered. FIG. 21 is a schematic diagram illustrating the flow of data when each reception side returns an ACK signal with respect to a multicast packet transmitted from a transmitter. In the illustrated example, the transmitter TX transmits a multicast packet to receivers RX1 to RX4 using a frequency f1. Furthermore, the receivers RX1 to RX4 transmit ACK signals for the multicast packet transmitted from the transmitter TX to the transmitter TX using the frequency f1.

However, since the ACK signals are transmitted from the receivers RX1 to RX4 at the same timing, it is highly probable that the ACK signals will collide with one another and it is probable that the ACK signals will not reach the transmitter TX. In order to avoid such a problem, a method in which the transmitter TX designates timings at which the receivers RX1 to RX4 transmit the ACK signals is considered.

However, when the number of receivers increases, a time required for ACK confirmation becomes long. Since it is necessary to transmit video data in a predetermined time in order to ensure the realtime property of video streaming, when a waiting time of the ACK confirmation becomes long, a transmittable time of the video data may be shortened. As a consequence, there is a problem that it is not possible to transmit video data to be transmitted in a predetermined time.

FIG. 22 is a schematic diagram illustrating a transmission timing of the multicast packet by the transmitter TX and transmission timings of the ACK signals by the receivers RX1 to RX4, which are illustrated in FIG. 21. In the illustrated example, the transmitter TX transmits a multicast packet Data1 at a time t1. Furthermore, the receivers RX1 to RX4 transmit Ack1 to Ack4 at a time ta1. Furthermore, the transmitter TX transmits a multicast packet Data2 at a time t2. Furthermore, the receivers RX1 to RX4 transmit Ack1 to Ack4 at a time ta2. As described above, since the receivers RX1 to RX4 are not able to simultaneously transmit the ACK signals, a time required for ACK confirmation becomes long.

Furthermore, a method in which interference between a multicast packet and an ACK signal is avoided by dividing a frequency used when the transmitter transmits the multicast packet and a frequency used when each receiver transmits the ACK signal is known (for example, see Japanese Patent Publication No. 3822466).

SUMMARY

According to the first aspect of the present invention, a multicast transmission terminal includes: a transmission/reception unit configured to perform multicast transmission using a predetermined center frequency and a bandwidth, and receive at least one acknowledgement transmitted using a center frequency different from the center frequency of the multicast transmission and a bandwidth narrower than the bandwidth of the multicast transmission; a discovery unit configured to transmit an inquiry packet in a broadcast manner and discover reception terminals which are destinations of the multicast transmission; an allocation unit configured to allocate a center frequency used when each of the reception terminals transmits the acknowledgement in response to the number of reception terminals discovered by the discovery unit, allocate the center frequency different from the center frequency of the multicast transmission to at least one of the reception terminals, and generate an allocation list indicating the allocation; and a notification control unit configured to allow the transmission/reception unit to transmit the allocation list generated by the allocation unit in the multicast manner.

According to the second aspect of the present invention, a multicast reception terminal includes: a transmission/reception unit configured to perform transmission/reception of data with another apparatus; an inquiry response unit configured to allow the transmission/reception unit to transmit an acknowledgement corresponding to an inquiry packet received in the transmission/reception unit; a frequency extraction unit configured to extract a center frequency used when the transmission/reception unit transmits the acknowledgement from a multicast packet received in the transmission/reception unit; and a frequency setting unit configured to set a center frequency used when the transmission/reception unit transmits the acknowledgement as the center frequency extracted by the frequency extraction unit.

According to the third aspect of the present invention, a multicast system includes: a multicast transmission terminal including a transmission/reception unit configured to perform multicast transmission using a predetermined center frequency and a bandwidth, and receive at least one acknowledgement transmitted using a center frequency different from the center frequency of the multicast transmission and a bandwidth narrower than the bandwidth of the multicast transmission, a discovery unit configured to transmit an inquiry packet in a broadcast manner and discover reception terminals which are destinations of the multicast transmission, an allocation unit configured to allocate a center frequency used when each of the reception terminals transmits the acknowledgement in response to the number of reception terminals discovered by the discovery unit, allocate the center frequency different from the center frequency of the multicast transmission to at least one of the reception terminals, and generate an allocation list indicating the allocation, and a notification control unit configured to allow the transmission/reception unit to transmit the allocation list generated by the allocation unit in the multicast manner; and a multicast reception terminal including a reception terminal transmission/reception unit configured to perform transmission/reception of data with another apparatus, an inquiry response unit configured to allow the reception terminal transmission/reception unit to transmit an acknowledgement corresponding to an inquiry packet received in the reception terminal transmission/reception unit, a frequency extraction unit configured to extract a center frequency used when the reception terminal transmission/reception unit transmits the acknowledgement from a multicast packet received in the reception terminal transmission/reception unit, and a frequency setting unit configured to set a center frequency used when the reception terminal transmission/reception unit transmits the acknowledgement as the center frequency extracted by the frequency extraction unit.

According to the fourth aspect of the present invention, a computer readable storage device saving a computer program causes a computer to execute: a transmission/reception step of executing multicast transmission using a predetermined center frequency and a bandwidth, and receiving at least one acknowledgement transmitted using a center frequency different from the center frequency of the multicast transmission and a bandwidth narrower than the bandwidth of the multicast transmission; a discovery step of transmitting an inquiry packet in a broadcast manner and discovering reception terminals which are destinations of the multicast transmission; an allocation step of allocating a center frequency used when each of the reception terminals transmits the acknowledgement in response to the number of reception terminals discovered in the discovery step, allocating the center frequency different from the center frequency of the multicast transmission to at least one of the reception terminals, and generating an allocation list indicating the allocation; and a notification control step of allowing the allocation list generated in the allocation step to be transmitted in the multicast manner.

According to the fifth aspect of the present invention, a computer readable storage device saving a computer program causes a computer to execute: a transmission/reception step of executing transmission/reception of data with another apparatus; an inquiry response unit configured to allow an acknowledgement corresponding to an inquiry packet received in the transmission/reception step to be transmitted; a frequency extraction step of extracting a center frequency used to transmit the acknowledgement from a multicast packet received in the transmission/reception step; and a frequency setting step of setting a center frequency used to transmit the acknowledgement as the center frequency extracted by the frequency extraction step.

According to the sixth aspect of the present invention, a multicast transmission method includes: a transmission/reception step of executing multicast transmission using a predetermined center frequency and a bandwidth, and receiving at least one acknowledgement transmitted using a center frequency different from the center frequency of the multicast transmission and a bandwidth narrower than the bandwidth of the multicast transmission; a discovery step of transmitting an inquiry packet in a broadcast manner and discovering reception terminals which are destinations of the multicast transmission; an allocation step of allocating a center frequency used when each of the reception terminals transmits the acknowledgement in response to the number of reception terminals discovered in the discovery step, allocating the center frequency different from the center frequency of the multicast transmission to at least one of the reception terminals, and generating an allocation list indicating the allocation; and a notification control step of allowing the allocation list generated in the allocation step to be transmitted in the multicast manner.

According to the seventh aspect of the present invention, a multicast reception method includes: a transmission/reception step of executing transmission/reception of data with another apparatus; an inquiry response unit configured to allow an acknowledgement corresponding to an inquiry packet received in the transmission/reception step to be transmitted; a frequency extraction step of extracting a center frequency used to transmit the acknowledgement from a multicast packet received in the transmission/reception step; and a frequency setting step of setting a center frequency used to transmit the acknowledgement as the center frequency extracted by the frequency extraction step.

BRIEF DESCRIPTION OF THE DRAWINGS

FIG. 9 is a schematic diagram illustrating the overview of a frequency band when center frequencies used to transmit an ACK signal are allocated in a frequency bandwidth used to transmit a multicast packet in a first embodiment of the present invention.

FIG. 10 is a schematic diagram illustrating the overview of a frequency band when center frequencies used to transmit an ACK signal are allocated outside of a frequency bandwidth used to transmit a multicast packet in a first embodiment of the present invention.

FIG. 11 is a schematic diagram illustrating a multicast-compatible receiver list, in which an ACK timing has been set, in a first embodiment of the present invention.

DETAILED DESCRIPTION OF THE PREFERRED EMBODIMENTS (First Embodiment)

Figure 1:
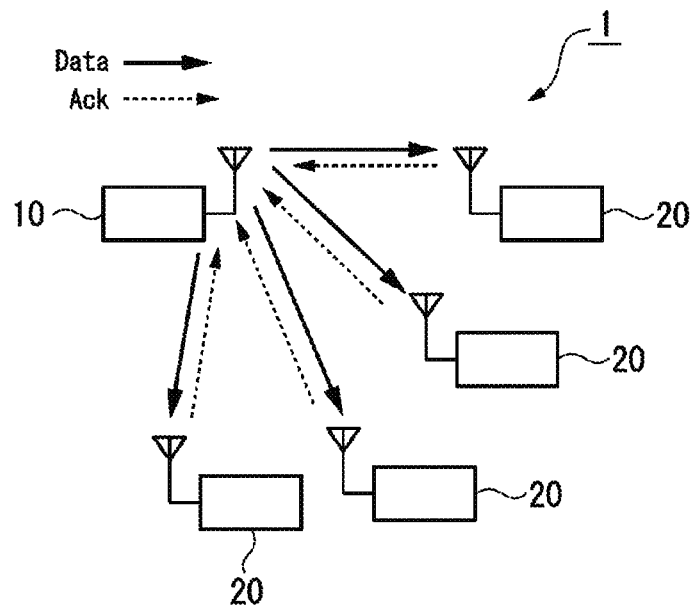
FIG. 1 is a schematic diagram illustrating a configuration of a multicast system in a first embodiment of the present invention.

Hereinafter, a first embodiment of the present invention will be described with reference to the drawings. FIG. 1 is a schematic diagram illustrating a configuration of a multicast system in the present embodiment. The multicast system 1 includes a multicast transmission terminal 10 and a plurality of multicast reception terminals 20. The multicast transmission terminal 10 acquires a video signal, and transmits the acquired video signal to the multicast reception terminals 20 serving as connection destinations in a multicast manner. The multicast reception terminals 20 receive the video signal transmitted from the multicast transmission terminal 10, and display a video based on the received video signal on a monitor and the like. In addition, a communication path between the multicast transmission terminal 10 and the multicast reception terminals 20 is wireless (radio) communication.

Figure 2:
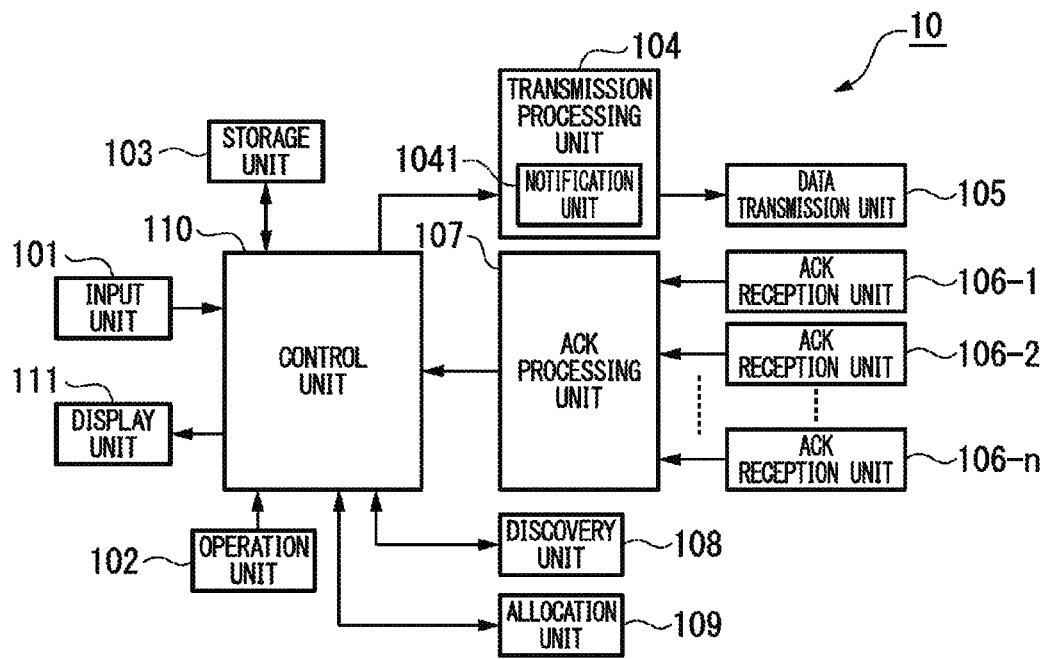
FIG. 2 is a block diagram illustrating a configuration of a multicast transmission terminal in a first embodiment of the present invention.

Next, the configuration of the multicast transmission terminal 10 will be described. FIG. 2 is a block diagram illustrating the configuration of the multicast transmission terminal 10 in the present embodiment. In the illustrated example, the multicast transmission terminal 10 includes an input unit 101, an operation unit 102, a storage unit 103, a transmission processing unit 104, a data transmission unit 105 (a transmission/reception unit), ACK reception units 106-1 to 106-*n* (transmission/reception units), an ACK processing unit 107, a discovery unit 108, an allocation unit 109, a control unit 110, and a display unit 111. Furthermore, the transmission processing unit 104 includes a notification unit 1041 (a notification control unit). In addition, indispensable constituents of the present invention are the notification unit 1041 of the transmission processing unit 104, the data transmission unit 105, the ACK reception units 106-1 to 106-*n*, the discovery unit 108, and the allocation unit 109.

The input unit 101 receives input of a video signal to be transmitted to the multicast reception terminals 20. The input unit 101, for example, receives input of a video signal from another apparatus. The operation unit 102 has a button or a lever which can be operated by a user, and receives input of instructions from the user. The storage unit 103 stores programs and various pieces of data.

The transmission processing unit 104 packetizes transmission data based on each setting value designated from the control unit 110. For example, a packet generated by the transmission processing unit 104 includes its own MAC address, a destination address (a MAC address of a specific receiver in the case of unicast, a group address in the case of multicast, and an unspecified address in the case of broadcast), a sequence number of transmission data, a retransmission flag, modulation speed information of the transmission data, and the like. The transmission processing unit 104 generates a transmission packet by dividing the packet generated by the transmission processing unit 104 to an appropriate transmission data size. Furthermore, the notification unit 1041 stores a multicast-compatible receiver list generated by the allocation unit 109 in a head part of the transmission packet. The multicast-compatible receiver list will be described later.

The data transmission unit 105 is a high frequency unit which includes an antenna, a transmission amplifier and the like, and modulates the transmission data and sets a predetermined radio frequency to radiate electric waves from the antenna. The data transmission unit 105 transmits the transmission packet generated by the notification unit 1041 with the set radio frequency. The plurality of ACK reception units 106-1 to 106-*n* are provided so as to be able to simultaneously receive a plurality of ACK signals (acknowledgement messages). Each of the ACK reception units 106-1 to 106-*n* includes an antenna, an LNA (Low noise Amp), a filter and the like, receives and demodulates an ACK signal transmitted using a predetermined frequency, and outputs the received ACK signal to the ACK processing unit of the rear stage. In addition, the antenna may also be common to the data transmission unit 105.

The ACK processing unit 107 detects the ACK signals input from the ACK reception units 106-1 to 106-*n*. Furthermore, when the desired number of ACK signals is not input in a predetermined time, the ACK processing unit 107 instructs the control unit 110 to perform a retransmission process of a multicast packet.

The discovery unit 108 performs a transmission/reception process of a control signal of a beacon and the like, and performs a discovery process of multicast reception terminals 20 capable of receiving the multicast packet. In detail, the discovery unit 108 transmits an inquiry packet in a broadcast manner, and receives response packets transmitted from the multicast reception terminals 20 capable of receiving the multicast packet in a predetermined time. Then, the discovery unit 108 specifies the multicast reception terminals 20 capable of receiving the multicast packet based on the received response packet, and outputs information for uniquely specifying the multicast reception terminals 20 to the control unit 110. The discovery unit 108 has a high frequency unit similar to that of the data transmission unit 105 or the ACK reception unit 106. The high frequency unit may be common to the data transmission unit 105 or the ACK reception unit 106.

The allocation unit 109 allocates a center frequency used when the multicast reception terminal 20 transmits an ACK signal, and generates a multicast-compatible receiver list (an allocation list) indicating the allocation. The control unit 110 performs the control of each element included in the multicast transmission terminal 10. Furthermore, based on the information for uniquely specifying the multicast reception terminals 20, which has been input from the discovery unit 108, the control unit 110 generates a list of the multicast reception terminals 20 capable of receiving the multicast packet, and stores the list in the storage unit 103. The display unit 111 displays various statuses and the like.

Figure 3:
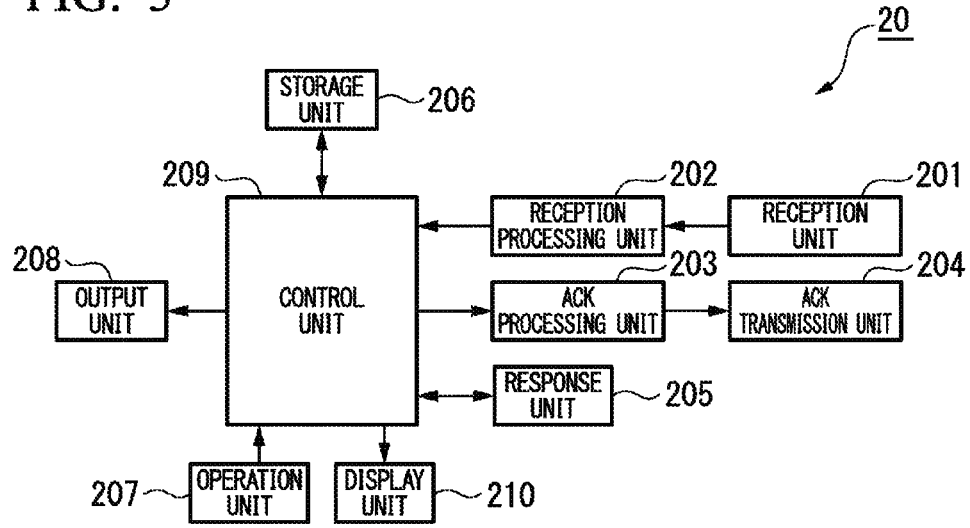
FIG. 3 is a block diagram illustrating a configuration of a multicast reception terminal in a first embodiment of the present invention.

Next, the configuration of the multicast reception terminal 20 will be described. FIG. 3 is a block diagram illustrating the configuration of the multicast reception terminal 20 in the present embodiment. In the illustrated example, the multicast reception terminal 20 includes a reception unit 201 (a transmission/reception unit or a reception terminal transmission/reception unit), a reception processing unit 202 (a frequency extraction unit), an ACK processing unit 203, an ACK transmission unit 204 (a transmission/reception unit or a reception terminal transmission/reception unit), a response unit 205 (an inquiry response unit), a storage unit 206, an operation unit 207, an output unit 208, a control unit 209 (a frequency setting unit), and a display unit 210. In addition, indispensable constituents of the present invention are the reception unit 201, the reception processing unit 202, the ACK transmission unit 204, the response unit 205, and the control unit 209.

The reception unit 201 is a high frequency unit which includes an antenna, an LNA, a filter and the like, and receives the electric waves transmitted from the multicast transmission terminal 10. The reception processing unit 202 extracts predetermined data from a high frequency signal received in the reception unit 201. For example, the reception processing unit 202 extracts a multicast packet of a video signal and a sequence number thereof, a designation frequency of an ACK signal, an error correction result and the like. The ACK processing unit 203 generates an ACK signal. The ACK transmission unit 204 transmits the ACK signal generated by the ACK processing unit 203.

The response unit 205 responds to the inquiry packet. The storage unit 206 stores programs and various pieces of data. The operation unit 207 has a button or a lever which can be operated by a user, and receives input of instructions from the user. The output unit 208 outputs the video signal transmitted from the multicast transmission terminal 10.

The control unit 209 performs the control of each element included in the multicast reception terminal 20. In detail, the control unit 209 stores the multicast packet of the received video signal in the storage unit 206. Furthermore, the control unit 209 generates a video frame from the multicast packet of the video signal stored in the storage unit 206, and outputs the video frame to the output unit 208. Furthermore, based on the data extracted by the reception processing unit 202, the control unit 209 designates an ACK frequency. Furthermore, when packet data has been damaged too much to be subjected to error correction, the control unit 209 controls an ACK signal not to be returned. Furthermore, the control unit 209 controls the response unit 205 to transmit a response packet indicating that it is possible to perform multicasting of the inquiry packet transmitted from the multicast transmission terminal 10. The display unit 210 displays various statuses and the like.

In addition, the configurations of the inquiry packet and the response packet used by the multicast transmission terminal 10 and the multicast reception terminal 20, for example, may be similar to various telegraphic messages used in a wireless (radio) LAN and the like, and a description thereof will be omitted in the present embodiment.

Figure 4:
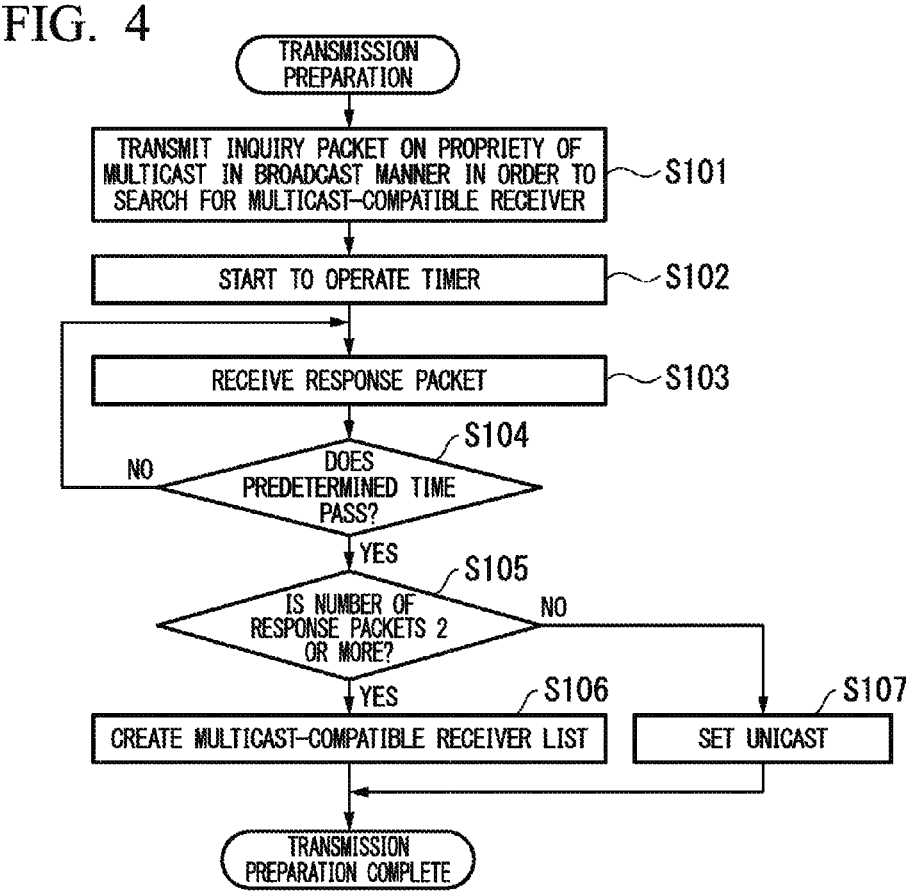
FIG. 4 is a flowchart illustrating an operation procedure when a multicast transmission terminal in a first embodiment of the present invention discovers a multicast reception terminal capable of receiving a multicast packet.

Next, an operation procedure when the multicast transmission terminal 10 discovers the multicast reception terminals 20 capable of receiving the multicast packet will be described. FIG. 4 is a flowchart illustrating the operation procedure when the multicast transmission terminal 10 in the present embodiment discovers the multicast reception terminals 20 capable of receiving the multicast packet.

(Step S101) The discovery unit 108 transmits an inquiry packet on the propriety of multicast in a broadcast manner in order to search for the multicast reception terminals 20 capable of receiving the multicast packet. Then, the procedure proceeds to the process of step S102.

(Step S102) The discovery unit 108 starts to operate a timer and starts the measurement of time. Then, the procedure proceeds to the process of step S103.

(Step S103) The discovery unit 108 receives response packets transmitted from the multicast reception terminals 20, and discovers multicast reception terminals 20 which are transmission destinations of the multicast packet. In detail, the discovery unit 108 extracts addresses of the multicast reception terminals 20 having transmitted the response packets. Then, the procedure proceeds to the process of step S104. In addition, since the response packets are returned at the same frequency as that used to transmit the inquiry packet, typical CSMA/CA is employed, and a predetermined period, for example, may be several seconds. In the process of the discovery unit 108, it is not necessary to ensure a realtime property, because it is important to reliably discover the multicast reception terminals 20.

(Step S104) The discovery unit 108 determines whether a predetermined time or more has passed after the measurement of the time in the process of step S102 is started. When the discovery unit 108 determines that the predetermined time or more has passed after the measurement of the time in the process of step S102 is started, the procedure proceeds to the process of step S105, and otherwise, the procedure returns to the process of step S103.

(Step S105) The discovery unit 108 determines whether the number of response packets received in the process of step S103 is 2 or more. When the discovery unit 108 determines that the number of response packets received in the process of step S103 is 2 or more, the procedure proceeds to the process of step S106, and otherwise, the procedure proceeds to the process of step S107.

(Step S106) The allocation unit 109 creates a multicast-compatible receiver list which is a list of the multicast reception terminals 20 discovered by the discovery unit 108 in the process of step S103, and stores the multicast-compatible receiver list in the storage unit 103. Then, the procedure ends.

(Step S107) The allocation unit 109 performs unicast setting. Then, the procedure ends.

Figure 5:
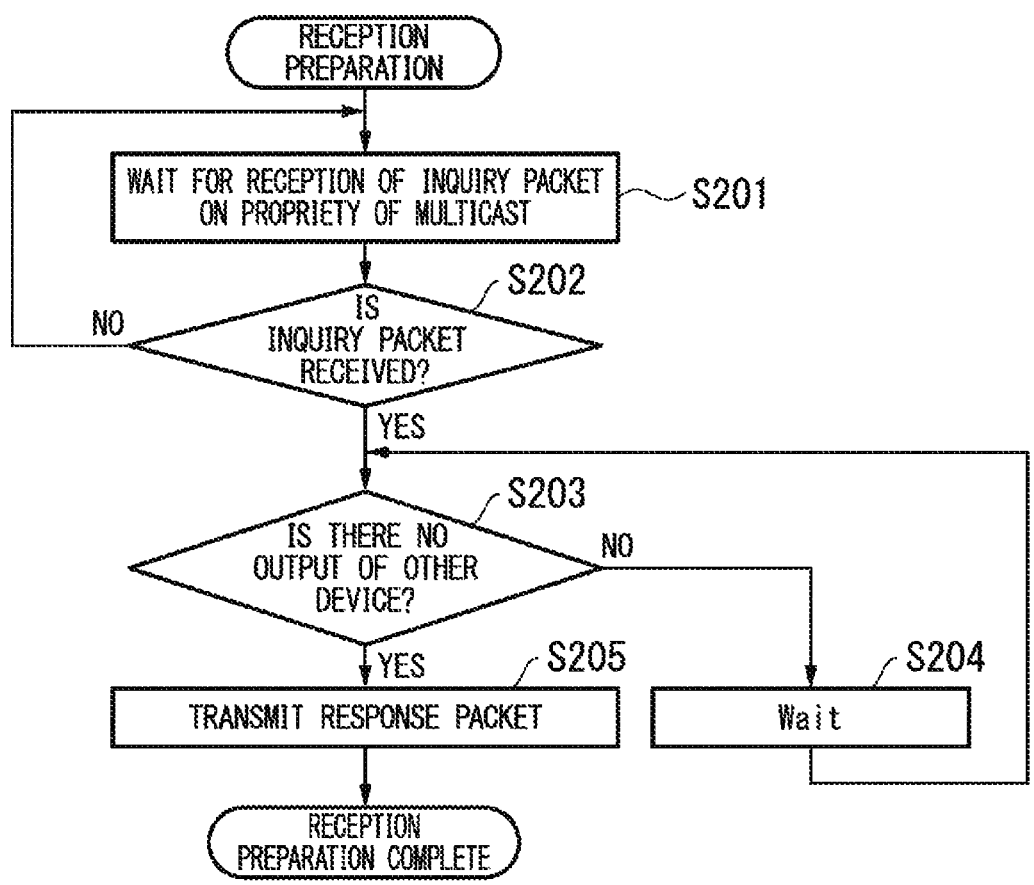
FIG. 5 is a flowchart illustrating an operation procedure when a multicast reception terminal in a first embodiment of the present invention transmits a response packet for a received multicast packet.

Next, an operation procedure when the multicast reception terminal 20 transmits the response packet for the received multicast packet will be described. FIG. 5 is a flowchart illustrating an operation procedure when the multicast reception terminal 20 in the present embodiment transmits the response packet for the received multicast packet.

(Step S201) The response unit 205 waits for reception of the inquiry packet on the propriety of the multicast packet, and receives the inquiry packet when the inquiry packet has been transmitted from the multicast transmission terminal 10. Then, the procedure proceeds to the process of step S202.

(Step S202) The response unit 205 determines whether the inquiry packet has been received in the process of step S201. When the response unit 205 determines that the inquiry packet has been received in the process of step S201, the procedure proceeds to the process of step S203, and otherwise, the procedure returns to the process of step S201.

(Step S203) The response unit 205 determines whether another device performs radio wave output. When the response unit 205 determines that the other device performs the radio wave output, the procedure proceeds to the process of step S204, and otherwise, the procedure proceeds to the process of step S205.

(Step S204) The response unit 205 waits for a predetermined time. Then, the procedure returns to the process of step S203.

(Step S205) The response unit 205 generates a response packet in which a multicast-compatible flag is set when its own apparatus is compatible with multicast. Subsequently, the response unit 205 transmits the generated response packet to the multicast transmission terminal 10 having transmitted the inquiry packet. At this time, the response unit 205 transmits the response packet using a collision avoidance means such as CSMA/CA in order to prevent the response packet from colliding with a packet radio wave output by the other device. In addition, at the time of response, the response unit 205 may notify of a frequency of an ACK signal available in its own apparatus.

Figure 6:
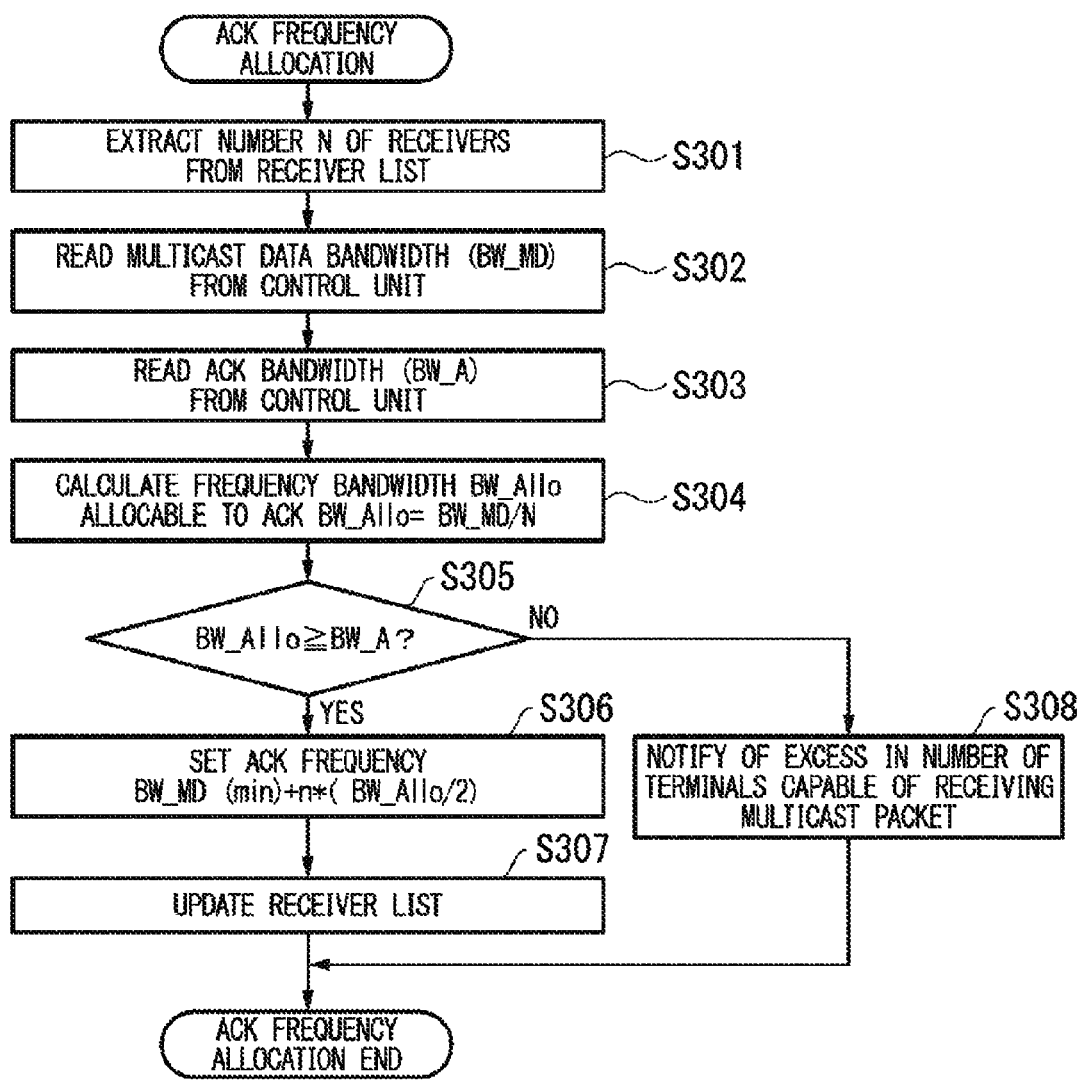
FIG. 6 is a flowchart illustrating an operation procedure when a multicast transmission terminal in a first embodiment of the present invention allocates a center frequency, which is used to transmit an ACK signal, to a multicast reception terminal.

Next, an operation procedure when the multicast transmission terminal 10 allocates the center frequency, which is used to transmit the ACK signal, to the multicast reception terminal 20 will be described. FIG. 6 is a flowchart illustrating an operation procedure when the multicast transmission terminal 10 in the present embodiment allocates the center frequency, which is used to transmit the ACK signal, to the multicast reception terminal 20. In the present embodiment, a center frequency different from a center frequency used to transmit the multicast packet is allocated to at least one multicast reception terminal 20. In addition, the illustrated operation procedure illustrates, as one example, a procedure in which the center frequency used to transmit the ACK signal is allocated in a frequency bandwidth used to transmit the multicast packet.

(Step S301) The allocation unit 109 extracts the number N of multicast reception terminals 20 included in the multicast-compatible receiver list stored in the storage unit 103. Then, the procedure proceeds to the process of step S302.

(Step S302) The allocation unit 109 reads a frequency bandwidth BM_MD used to transmit the multicast packet from the control unit 110. Then, the procedure proceeds to the process of step S303. In addition, the frequency bandwidth BM_MD used to transmit the multicast packet is uniquely prescribed by a communication method.

(Step S303) The allocation unit 109 reads a frequency bandwidth BW_A which can be used to transmit the ACK signal from the control unit 110. Then, the procedure proceeds to the process of step S304. In addition, the frequency bandwidth BW_A which can be used to transmit the ACK signal is uniquely prescribed by a communication method.

(Step S304) The allocation unit 109 calculates a frequency bandwidth BW_Allo allocable as a frequency (an ACK frequency) used in the transmission of the ACK signal. Then, the procedure proceeds to the process of step S305. The allocation unit 109, for example, calculates the frequency bandwidth BW_Allo allocable as the ACK frequency using Equation 1 below.

$$BW\_Allo = BM\_MD/N \quad (1)$$

(Step S305) The allocation unit 109 determines whether BW_Allo is equal to or more than BW_A. When the allocation unit 109 determines that BW_Allo is equal to or more than BW_A, the procedure proceeds to the process of step S306, and otherwise, the procedure proceeds to the process of step S308.

(Step S306) Since BW_Allo is equal to or more than BW_A, the allocation unit 109 determines that the allocation of the ACK frequency is possible and assigns the ACK frequency within BW_MD. As one example, when the ACK frequency is set from a low frequency side BW_MD (min) of BW_MD, the ACK frequency ACK_freq is expressed by Equation 2 below. In addition, n indicates the sequence of the multicast-compatible receiver list.

$$ACK\_{freq} = BW\_MD(\min) + n*(BW\_Allo/2) \quad (2)$$

In addition, ACK_freq may be arbitrarily set within the range of BW_MD. Moreover, ACK_freq may be set at a frequency interval. In this way, it is possible to avoid frequency interference (adjacent channel interference) between ACK signals. In the case of providing a frequency interval, for example, ACK_freq is considered to be separated by at least BW_Allo or one sub-carrier.

(Step S307) Based on the ACK frequency allocated in the process of step S306, the allocation unit 109 updates the multicast-compatible receiver list stored in the storage unit 103. Then, the procedure ends.

(Step S308) Since BW_Allo is smaller than BW_A, the allocation unit 109 determines that the allocation of the ACK frequency is not possible and notifies a user of an excess in the number of terminals capable of receiving the multicast packet. Then, the procedure ends.

In the aforementioned example, the center frequency used to transmit the ACK signal is allocated in the frequency bandwidth used to transmit the multicast packet; however, the present invention is not limited thereto. For example, the ACK frequency may be set out of BW_MD. In this case, when BW_Allo is calculated in the process of step S304, frequency bands BW_ALL permitted in the communication are used instead of BW_MD. Furthermore, among the frequency bands BW_ALL permitted in the communication, a frequency, which is S/N allowing the reception of the ACK signal by a communication quality detection unit, may be allocated.

Figures 7, 8:
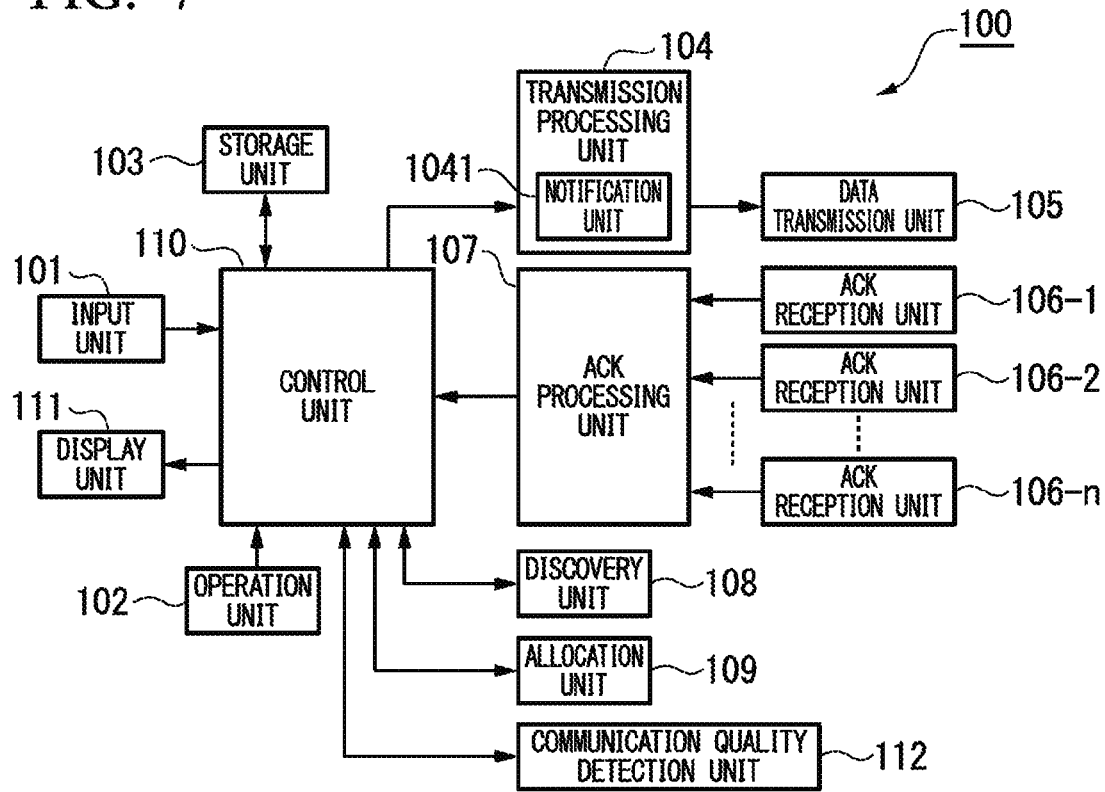
FIG. 7 is a block diagram illustrating a configuration when a multicast transmission terminal in a first embodiment of the present invention includes a communication quality detection unit.
FIG. 8 is a schematic diagram illustrating a multicast-compatible receiver list in a first embodiment of the present invention.

FIG. 7 is a block diagram illustrating a configuration when the multicast transmission terminal in the present embodiment includes a communication quality detection unit. In the aforementioned example, a multicast transmission terminal 100 includes an input unit 101, an operation unit 102, a storage unit 103, a transmission processing unit 104, a data transmission unit 105, ACK reception units 106-1 to 106-n, an ACK processing unit 107, a discovery unit 108, an allocation unit 109, a control unit 110, a display unit 111, and a communication quality detection unit 112. Furthermore, the transmission processing unit 104 includes a notification unit 1041.

The input unit 101, the operation unit 102, the storage unit 103, the transmission processing unit 104, the data transmission unit 105, the ACK reception units 106-1 to 106-n, the ACK processing unit 107, the discovery unit 108, the allocation unit 109, the control unit 110, the display unit 111, and the notification unit 1041 are similar to the elements illustrated in FIG. 2.

The communication quality detection unit 112 determines a frequency at which the ACK signal can be received. For example, the communication quality detection unit 112 measures an RSSI value in a predetermined frequency for several seconds, and when the measured average value is larger than minimum reception sensitivity of the ACK reception units 106-1 to 106-n, the communication quality detection unit 112 determines that the predetermined frequency is the frequency at which the ACK signal can be received. In addition, in the determination, even when it is S/N which is not proper in the transmission/reception of the multicast packet, as long as the ACK signal can also be received, it may be determined that it is possible to receive the ACK signal. As described above, a frequency that is not proper in the transmission/reception of the multicast packet but at which the ACK signal can be received is set as the ACK frequency, so that it is possible to effectively utilize a frequency.

Next, the multicast-compatible receiver list will be described. FIG. 8 is a schematic diagram illustrating the multicast-compatible receiver list in the present embodiment. The multicast-compatible receiver list has data items of "Rx No," "Addr," and "ACK freq," and stores data of each data item in correlation with each row. That is, MAC addresses of the multicast reception terminals 20 correspond to ACK frequencies allocated to the multicast reception terminals 20 in a one-to-one manner.

The data item "Rx No" stores the number of multicast reception terminals 20 discovered by the discovery unit 108. The data item "Addr" stores the MAC address of the multicast reception terminal 20 uniquely specified by "Rx No." The data item "ACK freq" stores an ACK frequency allocated to the multicast reception terminal 20 uniquely specified by "Rx No."

In the illustrated example, a value stored in the data item "Rx No" of a row 801 is "1," a value stored in the data item "Addr" is "Addr_1," and a value stored in the data item "ACK freq" is "f_1." This indicates that the MAC address of the multicast reception terminal 20 uniquely specified by Rx No "1" is "Addr_1" and the allocated ACK frequency is "$f_{-1}$." Note that other rows are as illustrated in the drawing.

In addition, the ACK frequency stored in the multicast-compatible receiver list may be set at the time of the generation of the multicast-compatible receiver list, or may be set immediately before the transmission of the multicast packet, which will described later.

Next, a schematic image of a transmission frequency of the multicast packet and a transmission frequency of the ACK signal will be described. FIG. 9 is a schematic diagram illustrating the overview of a frequency band when the center frequency used to transmit the ACK signal is allocated in the frequency bandwidth used to transmit the multicast packet in the present embodiment. In the illustrated example, center frequencies ACK_fl to ACK_fn used to transmit the ACK signal are allocated to a bandwidth 901 in which the multicast packet is transmitted. Since the multicast packet has a large data amount, a bandwidth is wide. On the other hand, since the ACK signal has a small data amount, a bandwidth is narrow. Therefore, the frequency bandwidth used to transmit the multicast packet is always wider than the frequency bandwidth used to transmit the ACK signal.

FIG. 10 is a schematic diagram illustrating the overview of a frequency band when the center frequency used to transmit the ACK signal is allocated outside of the frequency bandwidth used to transmit the multicast packet in the present embodiment. In the illustrated example, center frequencies ACK_f1 to ACK_f3 used to transmit the ACK signal are allocated outside of a bandwidth 1001 in which the multicast packet is transmitted.

Furthermore, when the number of multicast reception terminals 20 increases, the frequencies used in the transmission of the ACK signal increases, but an available frequency is finite. Therefore, from the standpoint of frequency use limitation, the number of multicast reception terminals 20 may be limited. For example, after the allocation unit 109 creates the multicast-compatible receiver list, the control unit 110 may determine whether the number of multicast reception terminals 20 included in the multicast-compatible receiver list is equal to or less than a predetermined number, and may display a notification for a user on the display unit 111 when the predetermined number is exceeded.

Furthermore, when the predetermined number is exceeded, an ACK timing may be set in the multicast-compatible receiver list. In addition, the setting of the ACK timing is performed by the allocation unit 109. Hereinafter, setting conditions and a setting method of the ACK timing by the allocation unit 109 will be described. When it is determined that there is no ACK frequency allocable to the multicast reception terminals 20, the allocation unit 109 sets the ACK timing of a multicast reception terminal 20 with no ACK frequency to a timing (for example, a timing at which an interval corresponding to an SIFS+ACK transmission time has increased) later than a multicast reception terminal 20 with the ACK frequency.

FIG. 11 is a schematic diagram illustrating the multicast-compatible receiver list, in which the ACK timing has been set, in the present embodiment. The multicast-compatible receiver list, in which the ACK timing has been set, has data items of "Rx No," "Addr," "ACK freq," and "ACK timing," and stores data of each data item in correlation with each row.

The data item "Rx No," the data item "Addr," and the data item "ACK freq" are similar to the data items illustrated in FIG. 8, respectively. The data item ACK timing" stores a timing at which the multicast reception terminal 20 uniquely specified by "Rx No" transmits the ACK signal.

In the illustrated example, a value stored in the data item "Rx No" of a row 1101 is "1," a value stored in the data item "Addr" is "Addr_1," a value stored in the data item "ACK freq" is "f_1," and a value stored in the data item "ACK timing" is "t1." This indicates that the MAC address of a multicast reception terminal 20 uniquely specified by Rx No "1" is "Addr_1," the allocated ACK frequency is "f_1," and the transmission timing of the set ACK signal is "t1."

Furthermore, a value stored in the data item "Rx No" of a row 1104 is "n," a value stored in the data item "Addr" is "Addr_n," a value stored in the data item "ACK freq" is "f_n," and a value stored in the data item "ACK timing" is "t2." This indicates that the MAC address of a multicast reception terminal 20 uniquely specified by Rx No "n" is "Addr_n," the allocated ACK frequency is "f_n," and the transmission timing of the set ACK signal is "t2." In addition, other rows are as illustrated in the drawing.

The example illustrated in FIG. 11 is an example in which since the allocation unit 109 determines that there is no ACK frequency allocable to the multicast reception terminals 20 with the MAC address of "Addr_n," the transmission timing of the ACK signal by the multicast reception terminal 20 with no ACK frequency and with the MAC address of "Addr_n" is set as t2 which is a timing (for example, a timing increased by an SIFS interval) next to t1.

Figure 12:
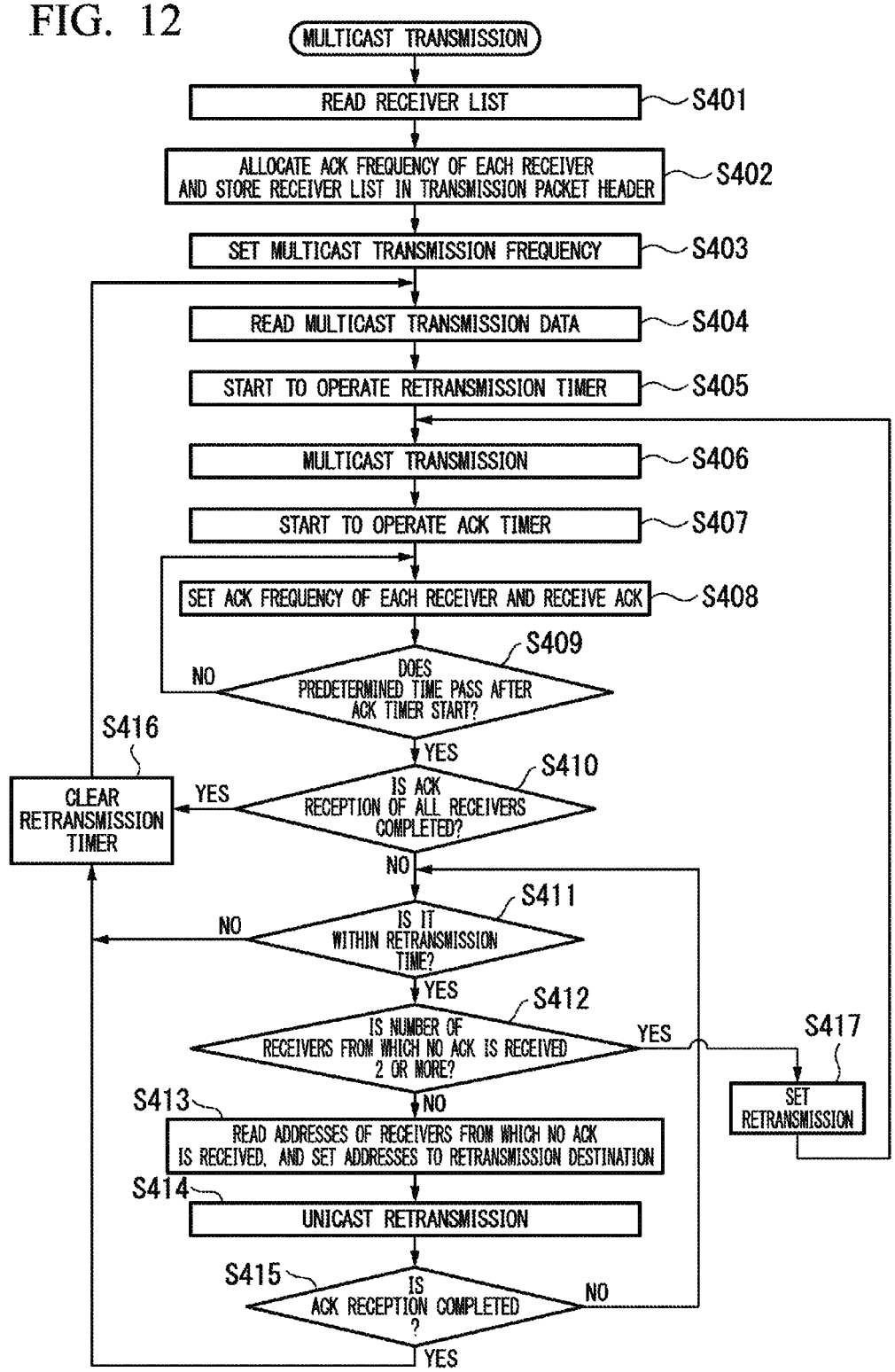
FIG. 12 is a flowchart illustrating an operation procedure when a multicast transmission terminal in a first embodiment of the present invention transmits a multicast packet.

Next, an operation procedure when the multicast transmission terminal 10 transmits the multicast packet will be described. FIG. 12 is a flowchart illustrating an operation procedure when the multicast transmission terminal 10 in the present embodiment transmits the multicast packet.

(Step S401) The allocation unit 109 reads the multicast-compatible receiver list stored in the storage unit 103. Then, the procedure proceeds to the process of step S402.

(Step S402) The allocation unit 109 allocates the ACK frequency to the multicast reception terminals 20 stored in the multicast-compatible receiver list read in the process of step S401, and updates the multicast-compatible receiver list. Subsequently, the notification unit 1041 stores the multicast-compatible receiver list in a transmission packet header. Then, the procedure proceeds to the process of step S403. In addition, there are several methods for allocating the ACK frequency to the multicast reception terminal 20 inclusive of the method illustrated in FIG. 6 and the like, and the following is a representative example.

In the allocation of the ACK frequency, the ACK frequency is set as a frequency in the frequency band used to transmit the multicast packet (see FIG. 9).
  In the allocation of the ACK frequency, the ACK frequency is set as a frequency of the sub-carrier used to transmit the multicast packet (see FIG. 9).
  In the allocation of the ACK frequency, the ACK frequency is set as a frequency outside of the frequency band used to transmit the multicast packet (see FIG. 10).
  When the number of multicast reception terminals 20 is small, frequency intervals of ACK frequencies to be allocated are widened (the intervals among f1 to f3 of FIG. 9 and FIG. 10 are widened).
  In the communication quality obtained by providing the communication quality detection unit 112, a frequency at which ACK communication is possible but which is not proper for multicast transmission is allocated as the ACK frequency. The degree of communication quality of a predetermined frequency band can be determined by measuring RSSI (Receiver Signal Strength Indicator) for a predetermined time and by use frequency or a noise level in other devices.

(Step S403) The transmission processing unit 104 sets a frequency to be used to transmit the multicast packet. Then, the procedure proceeds to the process of step S404.

(Step S404) The control unit 110 reads data (for example, video data) to be transmitted in a multicast manner from the storage unit 103. Then, the procedure proceeds to the process of step S405.

(Step S405) The control unit 110 starts to operate a retransmission timer in order to designate a retransmission period. Then, the procedure proceeds to the process of step S406. In addition, the retransmission period is a period in which a realtime property can be ensured even when the retransmission of the multicast packet occurs.

For example, in the case of performing video transmission of 60 frames per second, since a time per frame is 16 ms, the video transmission and a retransmission process need to be within this time. When the number of packets constituting one frame is N, 16 ms/N is a permissible transmission time per packet. If one frame is constituted by four packets, a permissible time per packet is 4 ms. If a data transmission time of one packet, for example, is 200 μs, SIFS is 20 μs, and an ACK signal reception time is 30 μs, retransmission can be performed 16 times. In addition, when the number of multicast reception terminals 20 increases and the ACK timings are t2 and t3 as well as t1, the number of retransmissions is small.

(Step S406) The notification unit 1041 generates the multicast packet from the data read in the process of step S404. In addition, the transmission packet header of the multicast packet generated by the notification unit 1041 includes the multicast-compatible receiver list stored in the process of step S402. Furthermore, the notification unit 1041 transmits the generated multicast packet via the data transmission unit 105 with the frequency set in the process of step S403 in a multicast manner. Then, the procedure proceeds to the process of step S407.

(Step S407) The control unit 110 starts to operate an ACK timer in order to receive an ACK response in a predetermined period after the data transmission unit 105 transmits the multicast packet. Then, the procedure proceeds to the process of step S408. In addition, a timer period is shorter than that of the retransmission timer, and for example, is set as an SIFS period similar to that of a wireless (radio) LAN.

(Step S408) Each of the ACK reception units 106-1 to 106-n adjusts PLL (not illustrated), and sets the PLL such that it is possible to receive the ACK signal transmitted with the ACK frequency allocated to each multicast reception terminal 20 in the process of step S402. Furthermore, when the ACK signal transmitted from each multicast reception terminal 20 is received, each of the ACK reception units 106-1 to 106-n outputs the received ACK signal to the ACK processing unit 107. Then, the procedure proceeds to the process of step S409.

(Step S409) The control unit 110 determines whether a predetermined time has passed after the ACK timer starts to operate in the process of step S407. When the control unit 110 determines that the predetermined time has passed after the ACK timer starts to operate in the process of step S407, the procedure proceeds to the process of step S410, and otherwise, the procedure returns to the process of step S408.

(Step S410) The control unit 110 determines whether the ACK signal is received from all the multicast reception terminals 20 to which the ACK frequency has been allocated in the process of step S402. When the control unit 110 determines that the ACK signal is received from all the multicast reception terminals 20 to which the ACK frequency has been allocated in the process of step S402, the procedure proceeds to the process of step S416, and otherwise, the procedure proceeds to the process of step S411.

(Step S411) The control unit 110 determines whether a predetermined time has not passed after the retransmission timer starts to operate in the process of step S405, that is, determines whether it is within a retransmission time. When the control unit 110 determines that it is within the retransmission time, the procedure proceeds to the process of step S412, and otherwise, the procedure proceeds to the process of step S416.

(Step S412) The control unit 110 determines whether the number of multicast reception terminals 20, from which the ACK signal has not been received, is 2 or more among the multicast reception terminals 20 to which the ACK frequency has been allocated in the process of step S402. When the control unit 110 determines that the number of multicast reception terminals 20, from which the ACK signal has not been received, is 2 or more among the multicast reception terminals 20 to which the ACK frequency has been allocated in the process of step S402, the procedure proceeds to the process of step S417, and otherwise, the procedure proceeds to the process of step S413.

(Step S413) The control unit 110 reads the MAC addresses of the multicast reception terminals 20, from which the ACK signal has not been received, from the multicast-compatible receiver list, and sets a retransmission destination. Then, the procedure proceeds to the process of step S414.

(Step S414) The notification unit 1041 transmits the multicast packet transmitted in the process of step S406 to the retransmission destination set in the process of step S413 with the frequency set in the process of step S403 via the data transmission unit 105 in a unicast manner. Then, the procedure proceeds to the process of step S415.

(Step S415) The control unit 110 determines whether the ACK signal has been received from the multicast reception terminal 20 which is the transmission destination of the unicast packet in the process of step S414. When the control unit 110 determines that the ACK signal has been received from the multicast reception terminal 20 which is the transmission destination of the unicast packet in the process of step S414, the procedure proceeds to the process of step S416, and otherwise, the procedure returns to the process of step S411.

(Step S416) The control unit 110 clears the retransmission timer. Then, the procedure returns to the process of step S404.

(Step S417) The notification unit 1041 sets a retransmission flag which is a header part of the multicast packet. Then, the procedure returns to the process of step S406.

According to the aforementioned processes, when the ACK signal has been received from all the multicast reception terminals 20 included in the multicast-compatible receiver list within the ACK timer period, the multicast transmission terminal 10 clears the retransmission timer and starts a transmission process of a next multicast packet. Furthermore, when the ACK signal is not received from two or more multicast reception terminals 20 within the ACK timer period among the multicast reception terminals 20 included in the multicast-compatible receiver list, the multicast transmission terminal 10 sets the retransmission flag and performs the retransmission of the multicast packet. Furthermore, when the ACK signal is not received from one multicast reception terminal 20 within the ACK timer period among the multicast reception terminals 20 included in the multicast-compatible receiver list, the multicast transmission terminal 10 performs retransmission with respect to the multicast reception terminal 20 in a unicast manner. In this way, an unnecessary process in the multicast reception terminal side 20 is avoided.

In addition, even when the ACK signal is not received from one multicast reception terminal 20 within the ACK timer period among the multicast reception terminals 20 included in the multicast-compatible receiver list, the retransmission flag may be set and the retransmission of the multicast packet may be performed. Furthermore, when the ACK signal is not received from two or more multicast reception terminals 20 within the ACK timer period among the multicast reception terminals 20 included in the multicast-compatible receiver list, the notification unit 1041 of the multicast transmission terminal 10 may retransmit a unicast packet to only the multicast reception terminals 20 from which the ACK signal has not been received.

Figure 13:
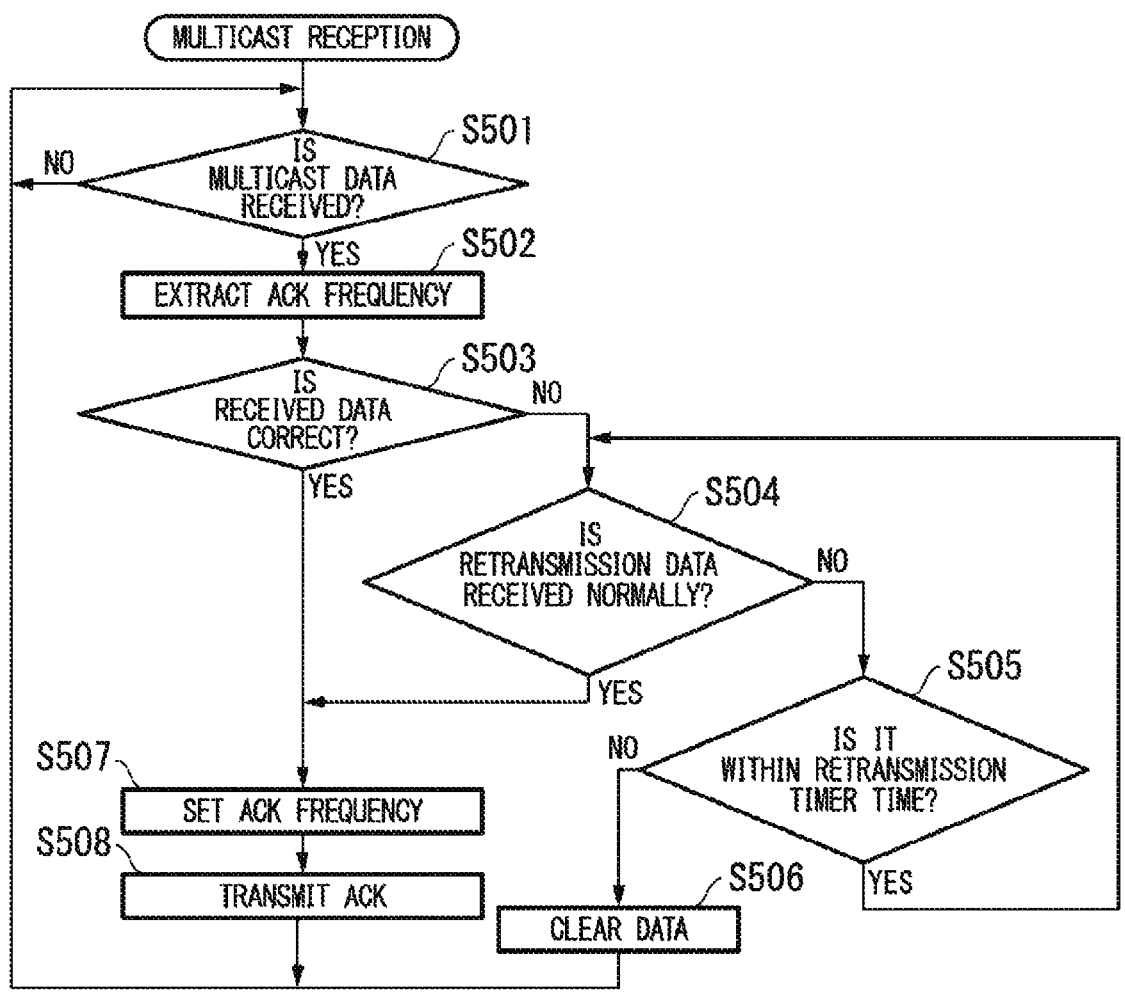
FIG. 13 is a flowchart illustrating an operation procedure when a multicast reception terminal in a first embodiment of the present invention receives a multicast packet transmitted from a multicast transmission terminal.

Next, an operation procedure when the multicast reception terminal 20 receives the multicast packet transmitted from the multicast transmission terminal 10 will be described. FIG. 13 is a flowchart illustrating an operation procedure when the multicast reception terminal 20 in the present embodiment receives the multicast packet transmitted from the multicast transmission terminal 10.

(Step S501) The control unit 209 determines whether the reception unit 201 has received the multicast packet transmitted from the multicast transmission terminal 10. When the control unit 209 determines that the reception unit 201 has received the multicast packet transmitted from the multicast transmission terminal 10, the procedure proceeds to the process of step S502, and otherwise, the process of step S501 is performed again.

(Step S502) The reception processing unit 202 acquires the multicast-compatible receiver list stored in the header part of the multicast packet received in the reception unit 201 in the process of step S501. Subsequently, the reception processing unit 202 extracts the ACK frequency allocated to its own apparatus from the acquired multicast-compatible receiver list. Then, the procedure proceeds to the process of step S503.

(Step S503) The reception processing unit 202 determines whether data of the multicast packet received in the reception unit 201 in the process of step S501 is correct data. When the reception processing unit 202 determines that the data of the multicast packet received in the reception unit 201 in the process of step S501 is correct data, the procedure proceeds to the process of step S507, and otherwise, the procedure proceeds to the process of step S504.

(Step S504) The control unit 209 determines whether the reception unit 201 has received the multicast packet retransmitted from the multicast transmission terminal 10. When the control unit 209 determines that the reception unit 201 has received the multicast packet retransmitted from the multicast transmission terminal 10 normally, the procedure proceeds to the process of step S507, and otherwise, the procedure proceeds to the process of step S505.

(Step S505) The control unit 209 determines whether it is within a retransmission timer time. When the control unit 209 determines that it is within the retransmission timer time, the procedure returns to the process of step S503, and otherwise, the procedure proceeds to the process of step S506.

(Step S506) The reception processing unit 202 clears the data of the multicast packet received in the reception unit 201 in the process of step S501. Then, the procedure returns to the process of step S501.

(Step S507) The ACK processing unit 203 sets the frequency, which is used to transmit the ACK signal by the ACK transmission unit 204, as the ACK frequency extracted by the reception processing unit 202 in the process of step S502 and allocated to its own apparatus. Then, the procedure proceeds to the process of step S508.

(Step S508) The ACK processing unit 203 generates the ACK packet and transmits the ACK packet to the multicast transmission terminal 10 via the ACK transmission unit 204. Then, the procedure returns to the process of step S501. In addition, when the reception of predetermined data is completed, the control unit 209 outputs the received predetermined data to the output unit 208.

As described above, according to the present embodiment, the discovery unit 108 discovers the multicast reception terminals 20 which are transmission destinations of the multicast packet. Furthermore, the allocation unit 109 allocates the center frequency used to transmit the ACK signal in response to the number of multicast reception terminals 20 discovered by the discovery unit 108, allocates a center frequency different from the center frequency of the multicast transmission to at least one multicast reception terminal 20, and generates the multicast-compatible receiver list indicating the allocation. Furthermore, the notification unit 1041 controls the data transmission unit 105 to transmit the multicast-compatible receiver list generated by the allocation unit 109 to each multicast reception terminal 20 in a multicast manner. In this way, the multicast transmission terminal 10 can allocate the frequency used in the transmission of the ACK signal to each multicast reception terminal 20, and can further notify each multicast reception terminal 20 of the allocation.

Furthermore, according to the present embodiment, the reception processing unit 202 acquires the multicast-compatible receiver list from the multicast packet received in the reception unit 201, and extracts the center frequency assigned to its own apparatus and used to transmit the ACK signal. Furthermore, the ACK processing unit 203 sets the center frequency, which is used to transmit the ACK signal by the ACK transmission unit 204, as the center frequency assigned to its own apparatus and used to transmit the ACK signal. Furthermore, the ACK transmission unit 204 transmits the ACK signal to the multicast transmission terminal 10 using the center frequency set by the ACK processing unit 203.

In this way, in the present embodiment, the multicast transmission terminal 10 and the multicast reception terminal 20 can simultaneously transmit/receive the ACK signal using different frequencies, so that it is possible to shorten a time required for the transmission/reception of the ACK signal. Consequently, it is possible to perform delivery confirmation of the multicast packet while ensuring a real-time property and to perform retransmission when it is not possible to transmit/receive the multicast packet normally, so that it is possible to suppress the degradation of communication quality.

Figure 14:
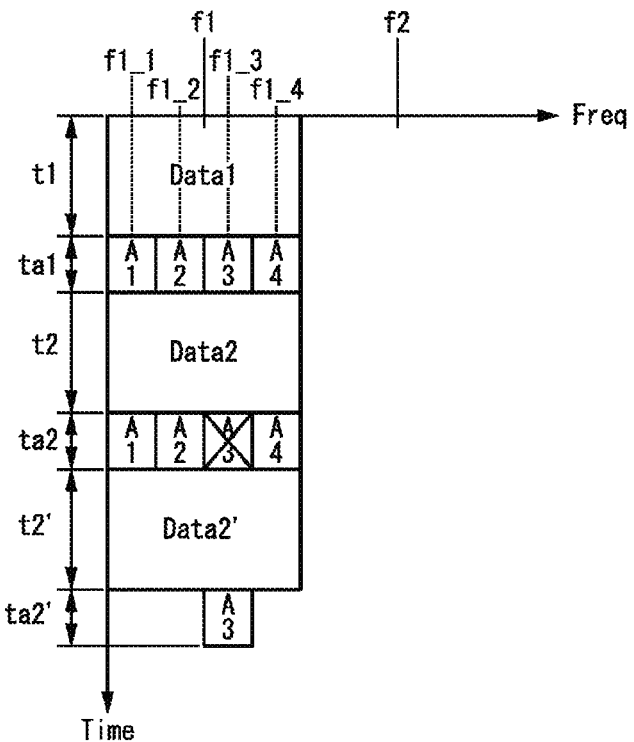
FIG. 14 is a schematic diagram illustrating a relation between a frequency and time when a frequency used in the transmission of a multicast packet and a frequency used in the transmission of an ACK signal are in the same frequency band in a first embodiment of the present invention.

FIG. 14 is a schematic diagram illustrating a relation between a frequency and a time when the frequency used in the transmission of the multicast packet and the frequency used in the transmission of the ACK signal are in the same frequency band in the present embodiment. In FIG. 14, a horizontal axis denotes a frequency and a vertical axis denotes time. In the illustrated example, a center frequency used in the transmission of the multicast packet by the multicast transmission terminal 10 is f1. Furthermore, center frequencies used in the transmission of the ACK signal by multicast reception terminals 20-1 to 20-4 are $f1\_1$ to $f1\_4$. In addition, the center frequencies $f1\_1$ to $f1\_4$ used in the transmission of the ACK signal by multicast reception terminals 20-1 to 20-4 are included in a frequency band used in the transmission of the multicast packet.

In the illustrated example, the multicast transmission terminal 10 transmits a multicast packet Data1 using the center frequency f1 at a time t1. Furthermore, since the multicast reception terminal 20-1 has received the multicast packet Data1 normally, it transmits ACK_A1 using the center frequency f1_1 at a time ta1. Furthermore, since the multicast reception terminal 20-2 has received the multicast packet Data1 normally, it transmits ACK_A2 using the center frequency f1_2 at the time ta1. Furthermore, since the multicast reception terminal 20-3 has received the multicast packet Data1 normally, it transmits ACK_A3 using the center frequency f1_3 at the time ta1. Furthermore, since the multicast reception terminal 20-4 has received the multicast packet Data1 normally, it transmits ACK_A4 using the center frequency f1_4 at the time ta1.

In this way, the multicast transmission terminal 10 can determine that the multicast packet Data1 has reached the multicast reception terminals 20-1 to 20-4 normally. Furthermore, since the multicast packet Data1 has reached the multicast reception terminals 20-1 to 20-4 normally, the multicast transmission terminal 10 transmits a multicast packet Data2 using the center frequency f1_1 at a time t2.

Since the multicast reception terminal 20-1 has received the multicast packet Data2 normally, it transmits ACK_A1 using the center frequency f1_1 at the time ta2. Furthermore, since the multicast reception terminal 20-2 has received the multicast packet Data2 normally, it transmits ACK_A2 using the center frequency f1_2 at the time ta2. Furthermore, the multicast reception terminal 20-4 has received the multicast packet Data2 normally, it transmits ACK_A4 using the center frequency f1_4 at the time ta2. However, since the multicast reception terminal 20-3 has not received the multicast packet Data2 normally, it does not transmit ACK_A3 at the time ta2.

In this way, the multicast transmission terminal 10 can determine that the multicast packet Data2 has reached the multicast reception terminals 20-1, 20-2, and 20-4 normally and has not reached the multicast reception terminal 20-3 normally. Furthermore, since the multicast packet Data2 has not reached the multicast reception terminal 20-3 normally, the multicast transmission terminal 10 transmits a multicast packet Data2' to the multicast reception terminal 20-3 using the center frequency f1_1 at a time t2'.

Since the multicast reception terminal 20-3 has received the multicast packet Data2' normally, it transmits ACK_A3 using the center frequency f1_3 at the time ta2'. In this way, the multicast transmission terminal 10 can determine that the multicast packet Data2' has reached the multicast reception terminal 20-3 normally.

Figure 15:
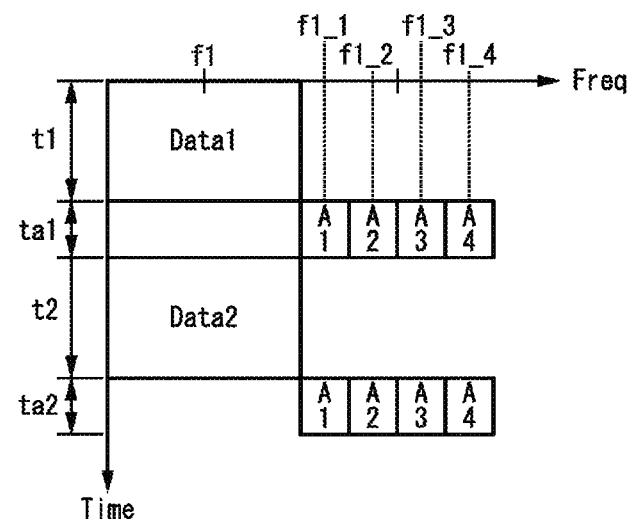
FIG. 15 is a schematic diagram illustrating a relation between a frequency and time when a frequency used in the transmission of a multicast packet and a frequency used in the transmission of an ACK signal are in different frequency bands in a first embodiment of the present invention.

FIG. 15 is a schematic diagram illustrating a relation between a frequency and time when the frequency used in the transmission of the multicast packet and the frequency used in the transmission of the ACK signal are in different frequency bands in the present embodiment. In FIG. 15, a horizontal axis denotes a frequency and a vertical axis denotes time. In the illustrated example, a center frequency used in the transmission of the multicast packet by the multicast transmission terminal 10 is f1. Furthermore, center frequencies used in the transmission of the ACK signal by the multicast reception terminals 20-1 to 20-4 are f1_1 to f1_4. In addition, the center frequencies f1_1 to f1_4 used in the transmission of the ACK signal by multicast reception terminals 20-1 to 20-4 are not included in a frequency band used in the transmission of the multicast packet.

In the illustrated example, the multicast transmission terminal 10 transmits a multicast packet Data1 using the center frequency f1 at a time t1. Furthermore, since the multicast reception terminal 20-1 has received the multicast packet Data1 normally, it transmits ACK_A1 using the center frequency f1_1 at a time ta1. Furthermore, since the multicast reception terminal 20-2 has received the multicast packet Data1 normally, it transmits ACK_A2 using the center frequency f1_2 at the time ta1. Furthermore, since the multicast reception terminal 20-3 has received the multicast packet Data normally 1, it transmits ACK_A3 using the center frequency f1_3 at the time ta1. Furthermore, since the multicast reception terminal 20-4 has received the multicast packet Data1 normally, it transmits ACK_A4 using the center frequency f1_4 at the time ta1. In addition, times t2 and ta2 are as illustrated in the drawing.

As illustrated in FIG. 14 and FIG. 15, the multicast transmission terminal 10 and the multicast reception terminal 20 can perform delivery confirmation of the multicast packet while ensuring a realtime property and perform retransmission when it is not possible to transmit/receive the multicast packet normally, so that it is possible to suppress the degradation of communication quality. In addition, in the example illustrated in FIG. 15, since the frequency used in the transmission of the multicast packet and the frequency used in the transmission of the ACK signal are in different frequency bands, the transmission interval of the multicast packet transmitted by the multicast transmission terminal 10 may be narrowed.

(Second Embodiment)

Hereinafter, a second embodiment of the present invention will be described. The configuration of a multicast reception terminal 20 in the present embodiment is similar to that of the multicast reception terminal 20 in the first embodiment.

Figures 16, 17:
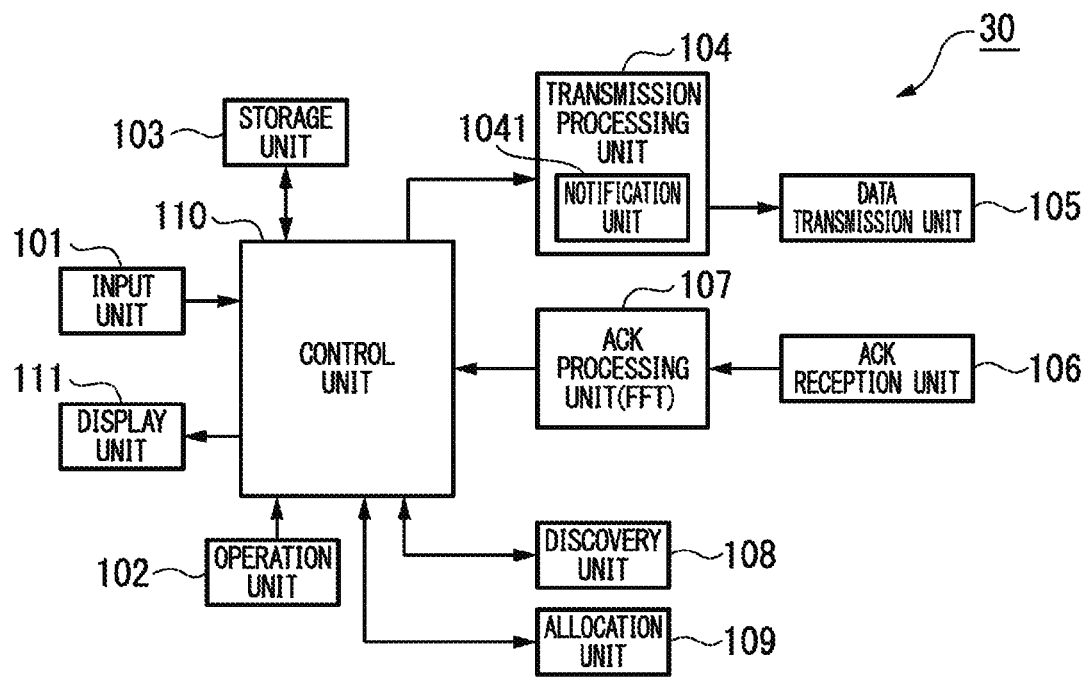
FIG. 16 is a block diagram illustrating a configuration of a multicast transmission terminal in a second embodiment of the present invention.
FIG. 17 is a schematic diagram illustrating a multicast-compatible receiver list in a second embodiment of the present invention.

FIG. 16 is a block diagram illustrating a configuration of a multicast transmission terminal 30 in the present embodiment. In the illustrated example, the multicast transmission terminal 30 includes an input unit 101, an operation unit 102, a storage unit 103, a transmission processing unit 104, a data transmission unit 105, an ACK reception unit 106, an ACK processing unit 107, a discovery unit 108, an allocation unit 109, a control unit 110, and a display unit 111. Furthermore, the transmission processing unit 104 includes a notification unit 1041. In addition, the elements included in the multicast transmission terminal 30 are similar to those included in the multicast transmission terminal 10 in the first embodiment.

The multicast transmission terminal 30 in the present embodiment is different from the multicast transmission terminal 10 in the first embodiment in that the multicast transmission terminal 30 in the present embodiment includes one ACK reception unit 106. The ACK processing unit 108 performs FFT processing. Therefore, even though ACK reception is simultaneously performed from a plurality of frequencies, ACK signals of each frequency can be separated from each other by the FFT processing. Furthermore, data items of the ACK transmission timing are provided in the multicast-compatible receiver list. In addition, operations of the multicast transmission terminal 30 and the multicast reception terminal 20 are similar to those of the multicast transmission terminal 10 and the multicast reception terminal 20 in the first embodiment, except for the ACK transmission timing of the ACK signal.

Hereinafter, the transmission/reception timings of an ACK signal of the multicast transmission terminal 30 and the multicast reception terminal 20 in the present embodiment will be described. FIG. 17 is a schematic diagram illustrating the multicast-compatible receiver list in the present embodiment. The multicast-compatible receiver list has data items of "Rx No," "Addr," "ACK freq," and "ACK timing," and stores data of each data item in correlation with each row. The data items are similar to those in the first embodiment In the illustrated example, a value stored in the data item "Rx No" of a row 1701 is "1," a value stored in the data item "Addr" is "Addr_1," a value stored in the data item "ACK freq" is "f_2," and a value stored in the data item "ACK timing" is "t1." This indicates that the MAC address of a multicast reception terminal 20 uniquely specified by Rx No "1 " is "Addr_1," the allocated ACK frequency is "f_2," and the transmission timing of the set ACK signal is "t1."

Furthermore, a value stored in the data item "Rx No" of a row 1102 is "2," a value stored in the data item "Addr" is "Addr_2," a value stored in the data item "ACK freq" is "f_2," and a value stored in the data item "ACK timing" is "t2." This indicates that the MAC address of a multicast reception terminal 20 uniquely specified by Rx No "2 " is "Addr_2," the allocated ACK frequency is "f_2," and the transmission timing of the set ACK signal is "t2." In addition, other rows are as illustrated in the drawing.

Figure 18:
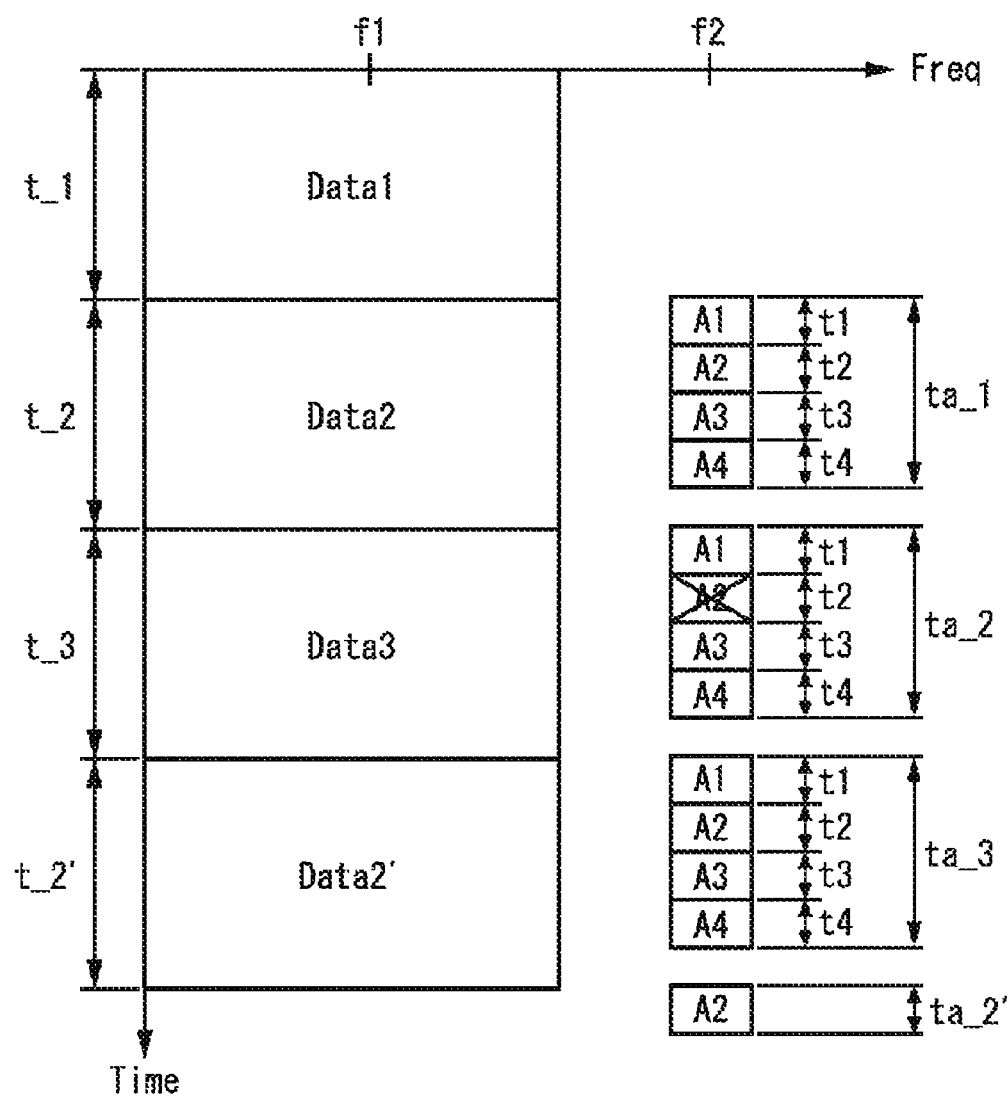
FIG. 18 is a schematic diagram illustrating a relation between a frequency and time when a frequency used in the transmission of a multicast packet and a frequency used in the transmission of an ACK signal are in different frequency bands and one frequency is used in the transmission of the ACK signal in a second embodiment of the present invention.

FIG. 18 is a schematic diagram illustrating a relation between a frequency and time when a frequency used in the transmission of the multicast packet and a frequency used in the transmission of the ACK signal are in different frequency bands and one frequency is used in the transmission of the ACK signal in the present embodiment. In FIG. 18, a horizontal axis denotes a frequency and a vertical axis denotes time. In the illustrated example, a center frequency used in the transmission of the multicast packet by the multicast transmission terminal 30 is f1. Furthermore, a center frequency used in the transmission of the ACK signal by multicast reception terminals 20-1 to 20-4 is f2. In addition, the center frequency f2 used in the transmission of the ACK signal by multicast reception terminals 20-1 to 20-4 is included in a frequency band used in the transmission of the multicast packet.

The multicast transmission terminal 30 transmits a multicast packet Data1 using the center frequency f1 at a time t_1. Furthermore, the multicast transmission terminal 30 transmits a multicast packet Data2 using the center frequency f1 at a time t_2.

Since the multicast reception terminal 20-1 has received the multicast packet Data1 normally, it transmits ACK_A1 using the center frequency f2 at a time ta_1. In addition, the time ta_1 is included in a time t_2. Furthermore, since the multicast reception terminal 20-2 has received the multicast packet Data1 normally, it transmits ACK_A2 using the center frequency f2 at a time t2 included in the time ta_1. Furthermore, since the multicast reception terminal 20-3 has received the multicast packet Data1 normally, it transmits ACK_A3 using the center frequency f2 at a time t3 included in the time to ta_1. Furthermore, since the multicast reception terminal 20-4 has received the multicast packet Data1 normally, it transmits ACK_A4 using the center frequency f2 at a time t4 included in the time ta_1.

In this way, the multicast transmission terminal 30 can determine that the multicast packet Data1 has reached the multicast reception terminals 20-1 to 20-4 normally. Furthermore, since the multicast packet Data1 has reached the multicast reception terminals 20-1 to 20-4 normally, the multicast transmission terminal 30 transmits a multicast packet Data3 at a time t_3 without performing the retransmission of the multicast packet Data1.

Since the multicast reception terminal 20-1 has received the multicast packet Data2 normally, it transmits ACK_A1 using the center frequency f2 at a time t1 included in a time ta_2. In addition, the time ta_2 is included in a time t3. Furthermore, since the multicast reception terminal 20-3 has received the multicast packet Data2 normally, it transmits ACK_A3 using the center frequency f2 at a time t3 included in the time ta_2. Furthermore, since the multicast reception terminal 20-4 has received the multicast packet Data2 normally, it transmits ACK_A4 using the center frequency f2 at a time t4 included in the time ta_2. However, since the multicast reception terminal 20-2 has not received the multicast packet Data2 normally, it does not transmit ACK_A2 at a time t2 included in the time ta_2.

In this way, the multicast transmission terminal 30 can determine that the multicast packet Data2 has reached the multicast reception terminals 20-1, 20-3, and 20-4 normally and has not reached the multicast reception terminal 20-2 normally. Furthermore, since the multicast packet Data2 has not reached the multicast reception terminal 20-2 normally, the multicast transmission terminal 30 transmits a multicast packet Data2' to the multicast reception terminal 20-2 using the center frequency f1 at a time t_2'.

Since the multicast reception terminal 20-2 has received the multicast packet Data2' normally, it transmits ACK_A2 using the center frequency f2 at the time ta_2'. In this way, the multicast transmission terminal 30 can determine that the multicast packet Data2' has reached the multicast reception terminal 20-2 normally.

As described above, according to the present embodiment, the multicast packet and the ACK signal can be continuously transmitted and received, so that it is possible to suppress the degradation of communication quality while ensuring a realtime property and to improve frequency use efficiency.

In addition, when the number of multicast reception terminals 20 increases, since an ACK transmission/reception time becomes long, the number of multicast reception terminals 20 may be limited such that the ACK transmission/reception time is shorter than a transmission/reception time of the multicast packet. For example, when the transmission/reception time of the multicast packet is set as t_n and the ACK transmission/reception time is set as ta_n, the number of multicast reception terminals 20 is limited such that ta_n is equal to or less than (t_n+1).

Furthermore, as illustrated in FIG. 18, since it is probable that a data sequence will be changed at the time of retransmission of the multicast packet, the control unit 209 of the multicast reception terminal 20 performs a data changing process and then outputs the multicast packet to the output unit 208 based on a sequence number of the multicast packet.

In addition, when the number of multicast reception terminals 20 increases, a frequency used in the transmission/reception of the ACK signal may be increased while ensuring conditions in which ta_n is equal to or less than (t_n+1).

Figure 19:
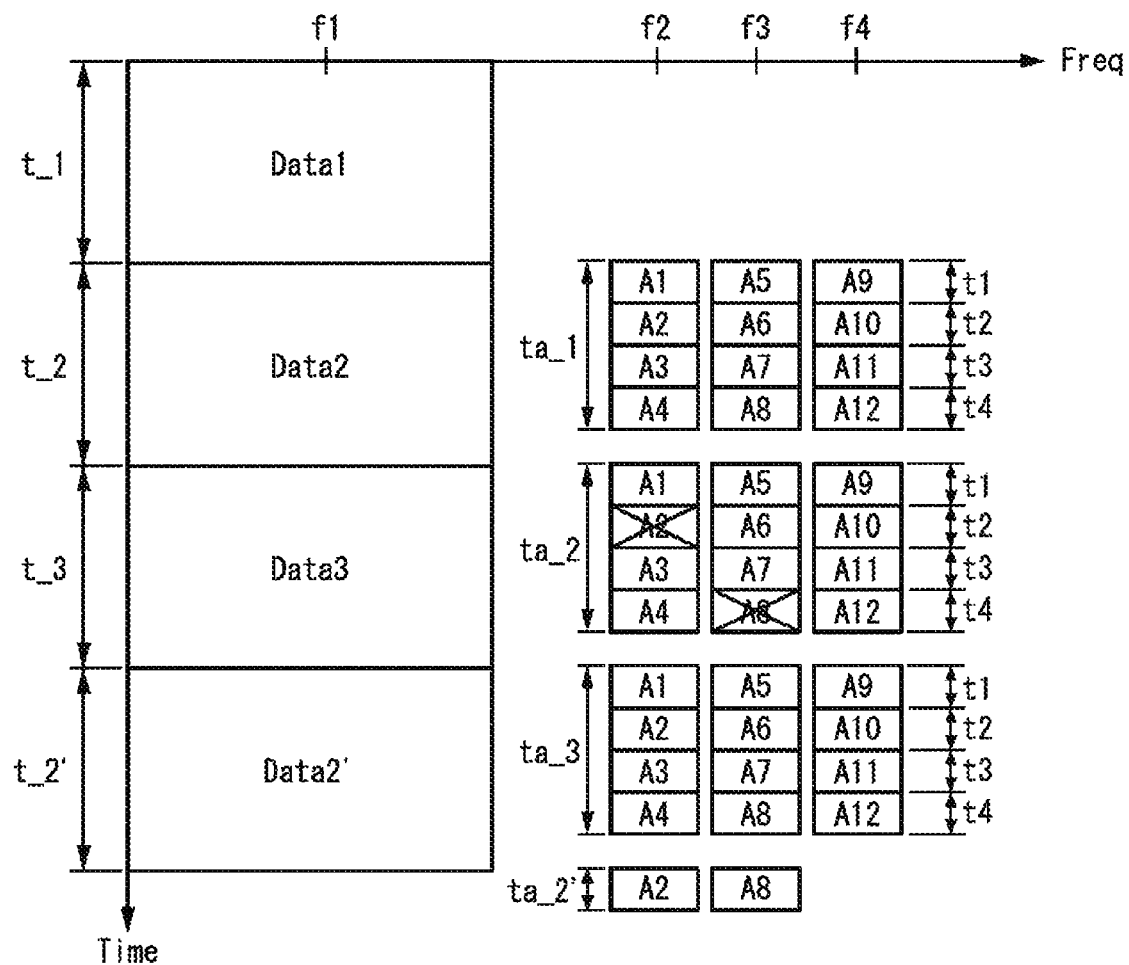
FIG. 19 is a schematic diagram illustrating a relation between a frequency and time when frequencies used in the transmission of a multicast packet and in the transmission of an ACK signal are in different frequency bands and a plurality of frequencies are used in the transmission of the ACK signal in a second embodiment of the present invention.
Figure 20:
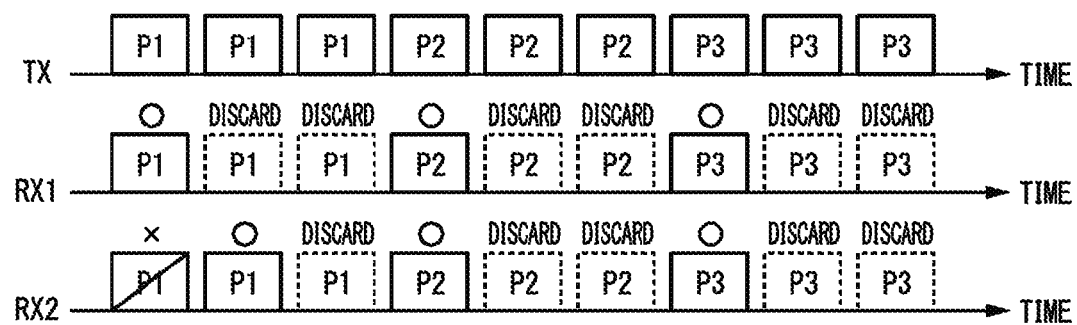
FIG. 20 is a timing chart illustrating a timing at which a transmitter transmits the same multicast packet and a timing at which a receiver receives the multicast packet when the transmitter transmits the same multicast packet a plurality of times in the conventional art.
Figure 21:
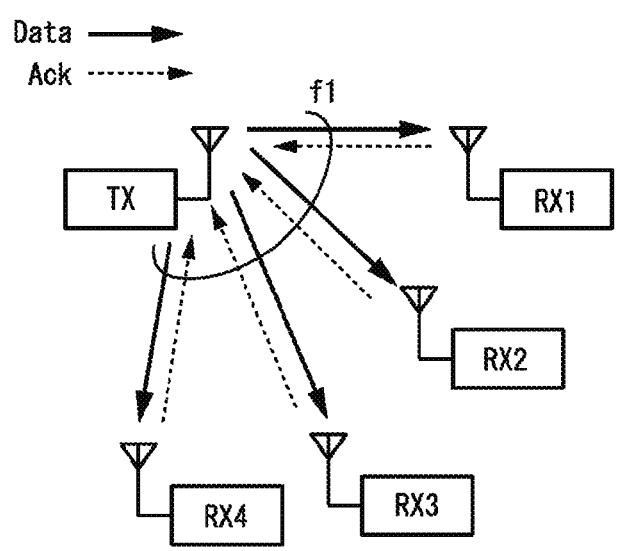
FIG. 21 is a schematic diagram illustrating the flow of data when each reception side returns an ACK signal with respect to a multicast packet transmitted from a transmitter in the conventional art.
Figure 22:
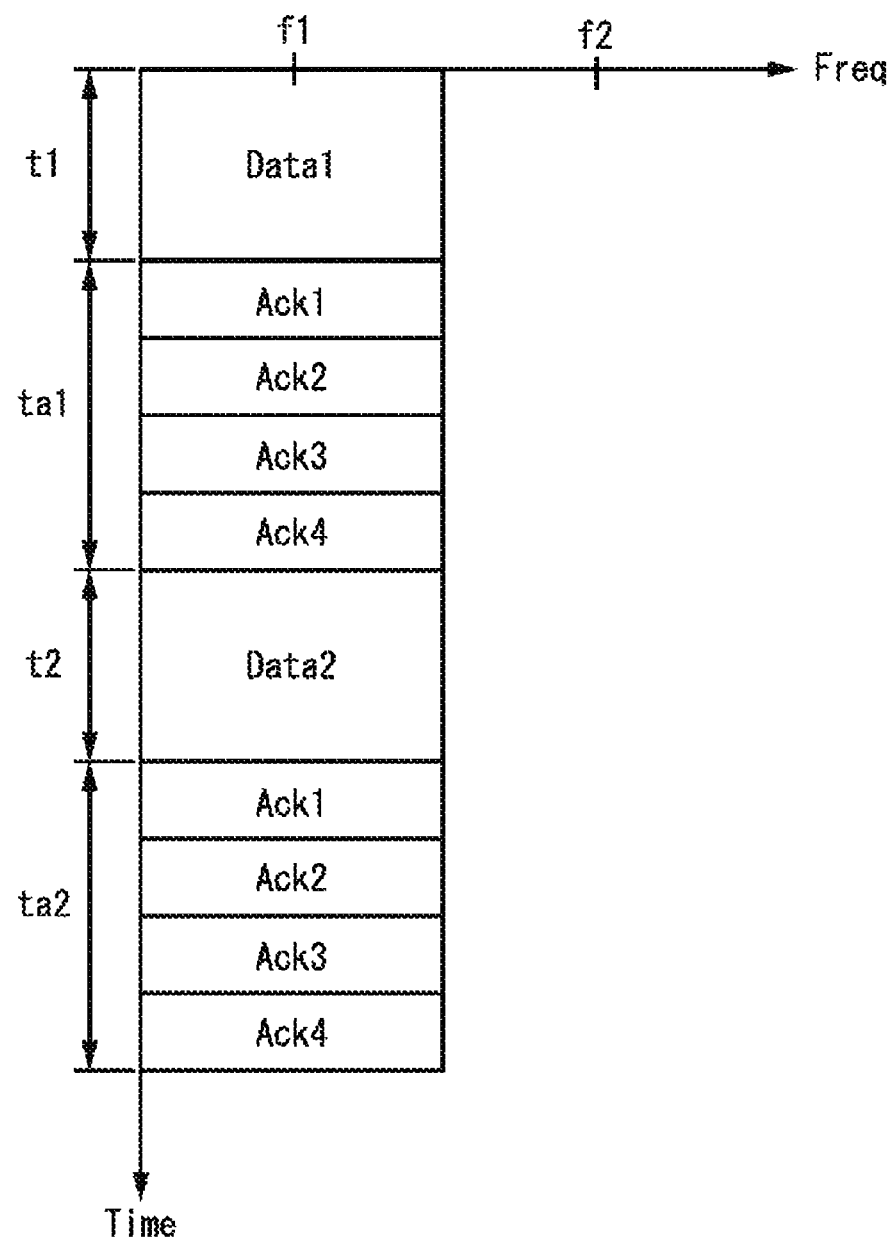
FIG. 22 is a schematic diagram illustrating a transmission timing of a multicast packet by a transmitter and transmission timings of ACK signals by receivers in the conventional art.

FIG. 19 is a schematic diagram illustrating a relation between a frequency and time when the frequencies used in the transmission of the multicast packet and in the transmission of the ACK signal are in different frequency bands and a plurality of frequencies are used in the transmission of the ACK signal in the present embodiment. In FIG. 19, a horizontal axis denotes a frequency and a vertical axis denotes time. In the illustrated example, a center frequency used in the transmission of the multicast packet by the multicast transmission terminal 30 is f1. Furthermore, a center frequency used in the transmission of the ACK signal by multicast reception terminals 20-1 to 20-4 is f2. Furthermore, a center frequency used in the transmission of the ACK signal by multicast reception terminals 20-5 to 20-8 is f3. Furthermore, a center frequency used in the transmission of the ACK signal by multicast reception terminals 20-9 to 20-12 is f4. In addition, the center frequencies f2 to f4 used in the transmission of the ACK signal by multicast reception terminals 20-1 to 20-12 are not included in a frequency band used in the transmission of the multicast packet.

The multicast transmission terminal 30 transmits a multicast packet Data1 using the center frequency f1 at a time t_1. Furthermore, the multicast transmission terminal 30 transmits a multicast packet Data2 using the center frequency f1 at a time t_2.

Since the multicast reception terminals 20-1 to 20-4 have received the multicast packet Data1 normally, they transmit ACK_A1 to ACK_A4 using the center frequency f2 at times t1 to t4 included in a time ta_1. In addition, the time ta_1 is included in a time t_2. Furthermore, since the multicast reception terminals 20-5 to 20-8 have received the multicast packet Data1 normally, they transmit ACK_A5 to ACK_A8 using the center frequency f3 at times t1 to t4 included in the time ta_1. Furthermore, since the multicast reception terminals 20-9 to 20-12 have received the multicast packet Data1 normally, they transmit ACK_A9 to ACK_A12 using the center frequency f4 at times t1 to t4 included in the time ta_1.

In this way, the multicast transmission terminal 30 can determine that the multicast packet Data1 has reached the multicast reception terminals 20-1 to 20-12 normally. Furthermore, since the multicast packet Data1 has reached the multicast reception terminals 20-1 to 20-12 normally, the multicast transmission terminal 30 transmits a multicast packet Data3 at a time t_3 without performing the retransmission of the multicast packet Data1.

Since the multicast reception terminals 20-1, 20-3, and 20-4 have received the multicast packet Data2 normally, they transmit ACK_A1, A3, and ACK_A4 using the center frequency f2 at times t1, t3, and t4 included in a time ta_2. In addition, the time ta_2 is included in a time t_3. Furthermore, since the multicast reception terminals 20-5 to 20-7 have received the multicast packet Data2 normally, they transmit ACK_A5 to ACK_A7 using the center frequency f2 at times t1 to t3 included in the time ta_2. Furthermore, since the multicast reception terminals 20-9 to 20-12 have received the multicast packet Data2 normally, they transmit ACK_A9 to ACK_A12 using the center frequency f2 at times t1 to t4 included in the time ta_2. However, since the multicast reception terminal 20-2 has not received the multicast packet Data2 normally, it does not transmit ACK_A2 at a time t2 included in the time to ta_2. Furthermore, since the multicast reception terminal 20-8 has not received the multicast packet Data2 normally, it does not transmit ACK_A2 at a time t4 included in the time ta_2.

In this way, the multicast transmission terminal 30 can determine that the multicast packet Data2 has reached the multicast reception terminals 20-1, 20-3 to 20-7, and 20-9 to 20-12 normally and has not reached the multicast reception terminals 20-2 and 20-8 normally. Furthermore, since the multicast packet Data2 has not reached the multicast reception terminals 20-2 and 20-8 normally, the multicast transmission terminal 30 transmits a multicast packet Data2' to the multicast reception terminals 20-2 and 20-8 using the center frequency f1 at a time t_2'.

Since the multicast reception terminals 20-2 and 20-8 have received the multicast packet Data2' normally, they transmit ACK_A2 and A8 using the center frequency f2 at the time ta_2'. In this way, the multicast transmission terminal 30 can determine that the multicast packet Data2' has reached the multicast reception terminals 20-2 and 20-8 normally.

In addition, as illustrated in FIG. 19, when the number of multicast reception terminals 20 for which the retransmission of the multicast packet is necessary is 2 or more, "ACK freq" and "ACK Timing" stored in the multicast-compatible receiver list may be automatically changed. That is, as illustrated in FIG. 19, when the retransmission of the multicast packet is performed for the multicast reception terminals 20-2 and 20-8, the multicast-compatible receiver list of the retransmission multicast packet may include only the multicast reception terminals 20-2 and 20-8. Furthermore, at this time, when the number of multicast reception terminals 20 subjected to the retransmission of the multicast packet is equal to or less than a predetermined number (in detail, it is similar to the ACK allocation propriety determination in the first embodiment), "ACK Timing," which is the transmission timing of the ACK signal, may also be changed.

As described above, the allocation unit 109 of the multicast transmission terminal 30 automatically allocates the center frequency used to transmit the ACK signal and the transmission timing of the ACK signal to each multicast reception terminal 20, so that it is possible to cope with many multicast reception terminals 20. In addition, similarly to the first embodiment, an interval of the center frequency used to transmit the ACK signal is provided, so that it is also possible to enhance tolerance against interference.

In addition, all or some of the functions of each element included in the multicast transmission terminals 10 and 30 and all or some of the functions of each element included in the multicast reception terminal 20 in the aforementioned embodiments may be realized by recording a program for realizing the functions in a computer-readable recording medium, and allowing the program recorded in the recording medium to be read and executed by a computer system. In addition, the "computer system" herein is assumed to include hardware such as an OS and a peripheral device.

Furthermore, the "computer-readable recording medium" indicates a portable medium such as a flexible disk, a magneto-optical disc, a ROM, and a CD-ROM, and a storage unit such as a hard disk embedded in the computer system. Moreover, the "computer-readable recording medium" may also include a medium for dynamically holding a program for a short time period such as a communication line in the case of transmitting the program via a network such as the Internet or a communication line such as a telephone line, and a medium for holding the program for a constant time period such as a volatile memory in the computer system serving as a server or a client in that case. Furthermore, the aforementioned program may also be a program for realizing some of the aforementioned functions, or a program capable of realizing the aforementioned functions in combination with a program in which the aforementioned functions have been previously recorded in the computer system.

So far, the first and second embodiments of the present invention have been described with reference to the accompanying drawings. However, detailed configurations are not limited to the abovementioned embodiments. The present invention may be subject to design and the like in a range not departing from the spirit of the present invention.

The present invention can be widely applied to a multicast transmission terminal, a multicast reception terminal, a multicast system, a program, a multicast transmission method, and a multicast reception method, so that it is possible to suppress the degradation of communication quality by enabling delivery confirmation while ensuring a realtime property in multicasting.

What is claimed is:

1. A multicast transmission terminal comprising:
a transmission and reception unit configured to perform multicast transmission using a predetermined center frequency and a bandwidth, and receive at least one acknowledgement transmitted using a center frequency different from the center frequency of the multicast transmission and a bandwidth narrower than the bandwidth of the multicast transmission;
a discovery unit configured to transmit an inquiry packet in a broadcast manner and discover reception terminals which are destinations of the multicast transmission;
an allocation unit configured to allocate a center frequency used when each of the reception terminals transmits the acknowledgement in response to the number of reception terminals discovered by the discovery unit, allocate the center frequency different from the center frequency of the multicast transmission to at least one of the reception terminals, and generate an allocation list indicating the allocation; and
a notification control unit configured to allow the transmission and reception unit to transmit the allocation list generated by the allocation unit in the multicast manner.

2. The multicast transmission terminal according to claim 1, wherein the allocation unit allocates the center frequency used when each of the reception terminals transmits the acknowledgement in a band of the multicast transmission.

3. The multicast transmission terminal according to claim 2, wherein the allocation unit allocates the center frequency used when each of the reception terminals transmits the acknowledgement to a sub-carrier frequency in the band of the multicast transmission.

4. The multicast transmission terminal according to claim 1, wherein the allocation unit allocates the center frequency used when each of the reception terminals transmits the acknowledgement outside of a band of the multicast transmission.

5. The multicast transmission terminal according to claim 4, wherein the transmission and reception unit receives the acknowledgement transmitted outside of the band of the multicast transmission, and receives the plurality of acknowledgements using the same center frequency in a time division scheme.

6. The multicast transmission terminal according to claim 4, wherein the allocation unit designates a timing at which each of the reception terminals transmits the acknowledgement in a time division scheme.

7. The multicast transmission terminal according to claim 1, wherein the allocation unit allocates the center frequency used when each of the reception terminals transmits the acknowledgement outside of a band of the multicast transmission and to a plurality of frequencies.

8. The multicast transmission terminal according to claim 4, comprising:
a communication quality detection unit configured to detect communication quality,
wherein the allocation unit allocates the center frequency to be used to transmit the acknowledgement in a frequency band in which the communication quality detected by the communication quality detection unit is equal to or less than a predetermined signal to noise (S/N) ratio.

9. A multicast reception terminal comprising: a transmission and reception unit configured to perform transmission or reception of data with another apparatus; an inquiry response unit configured to allow the transmission and reception unit to transmit an acknowledgement corresponding to an inquiry packet received in the transmission and reception unit; a frequency extraction unit configured to extract a center frequency used when the transmission and reception unit transmits an acknowledgement corresponding to a multicast packet from the multicast packet received in the transmission and reception unit; and a frequency setting unit configured to set a center frequency used when the transmission and reception unit transmits the acknowledgement corresponding to the multicast packet as the center frequency extracted by the frequency extraction unit, wherein the center frequency is different from a center frequency used when transmitting the multicast packet.

10. A multicast system comprising:
a multicast transmission terminal including a transmission and reception unit configured to perform multicast transmission using a predetermined center frequency and a bandwidth, and receive at least one acknowledgement transmitted using a center frequency different from the center frequency of the multicast transmission and a bandwidth narrower than the bandwidth of the multicast transmission, a discovery unit configured to transmit an inquiry packet in a broadcast manner and discover reception terminals which are destinations of the multicast transmission, an allocation unit configured to allocate a center frequency used when each of the reception terminals transmits the acknowledgement in response to the number of reception terminals discovered by the discovery unit, allocate the center frequency different from the center frequency of the multicast transmission to at least one of the reception terminals, and generate an allocation list indicating the allocation, and a notification control unit configured to allow the transmission and reception unit to transmit the allocation list generated by the allocation unit in the multicast manner; and a multicast reception terminal including a reception terminal transmission and reception unit configured to perform transmission or reception of data with another apparatus, an inquiry response unit configured to allow the reception terminal transmission and reception unit to transmit an acknowledgement corresponding to an inquiry packet received in the reception terminal transmission and reception unit, a frequency extraction unit configured to extract a center frequency used when the reception terminal transmission and reception unit transmits the acknowledgement from a multicast packet received in the reception terminal transmission and reception unit, and a frequency setting unit configured to set a center frequency used when the reception terminal transmission and reception unit transmits the acknowledgement as the center frequency extracted by the frequency extraction unit.

11. A computer readable storage device saving a computer program for causing a computer to execute:
a transmission and reception step of executing multicast transmission using a predetermined center frequency and a bandwidth, and receiving at least one acknowledgement transmitted using a center frequency different from the center frequency of the multicast transmission and a bandwidth narrower than the bandwidth of the multicast transmission;
a discovery step of transmitting an inquiry packet in a broadcast manner and discovering reception terminals which are destinations of the multicast transmission;
an allocation step of allocating a center frequency used when each of the reception terminals transmits the acknowledgement in response to the number of reception terminals discovered in the discovery step, allocating the center frequency different from the center frequency of the multicast transmission to at least one of the reception terminals, and generating an allocation list indicating the allocation; and a notification control step of allowing the allocation list generated in the allocation step to be transmitted in the multicast manner.

12. A computer readable storage device saving a computer program for causing a computer to execute: a transmission and reception step of executing transmission and reception of data with another apparatus; an inquiry response unit configured to allow an acknowledgement corresponding to an inquiry packet received in the transmission and reception step to be transmitted; a frequency extraction step of extracting a center frequency used to transmit an acknowledgement corresponding to a multicast packet from the multicast packet received in the transmission and reception step; and a frequency setting step of setting a center frequency used to transmit the acknowledgement corresponding to the multicast packet as the center frequency extracted by the frequency extraction step, wherein the center frequency is different from a center frequency used when transmitting the multicast packet.

13. A multicast transmission method comprising:
 a transmission and reception step of executing multicast transmission using a predetermined center frequency and a bandwidth, and receiving at least one acknowledgement transmitted using a center frequency different from the center frequency of the multicast transmission and a bandwidth narrower than the bandwidth of the multicast transmission;
 a discovery step of transmitting an inquiry packet in a broadcast manner and discovering reception terminals which are destinations of the multicast transmission;
 an allocation step of allocating a center frequency used when each of the reception terminals transmits the acknowledgement in response to the number of reception terminals discovered in the discovery step, allocating the center frequency different from the center frequency of the multicast transmission to at least one of the reception terminals, and generating an allocation list indicating the allocation; and
 a notification control step of allowing the allocation list generated in the allocation step to be transmitted in the multicast manner.

14. A multicast reception method comprising: a transmission and reception step of executing transmission and reception of data with another apparatus; an inquiry response unit configured to allow an acknowledgement corresponding to an inquiry packet received in the transmission and reception step to be transmitted; a frequency extraction step of extracting a center frequency used to transmit an acknowledgement corresponding to a multicast packet from the multicast packet received in the transmission and reception step; and a frequency setting step of setting a center frequency used to transmit the acknowledgement corresponding to the multicast packet as the center frequency extracted by the frequency extraction step, wherein the center frequency is different from a center frequency used when transmitting the multicast packet.

* * * * *